(12) United States Patent
Dallaire

(10) Patent No.: US 8,268,453 B2
(45) Date of Patent: Sep. 18, 2012

(54) STEEL BASED COMPOSITE MATERIAL

(75) Inventor: Serge Dallaire, Longueuil (CA)

(73) Assignee: Synthesarc Inc., Boucherville, Québec (CA)

(*) Notice: Subject to any disclaimer, the term of this patent is extended or adjusted under 35 U.S.C. 154(b) by 83 days.

(21) Appl. No.: 12/536,973

(22) Filed: Aug. 6, 2009

(65) Prior Publication Data

US 2011/0033730 A1  Feb. 10, 2011

(51) Int. Cl.
 *B32B 15/04* (2006.01)
 *B32B 15/18* (2006.01)
(52) U.S. Cl. ........ 428/627; 428/682; 428/683; 428/684; 428/685
(58) Field of Classification Search .............. 428/615, 428/683, 682, 627, 681, 684, 685, 628
See application file for complete search history.

(56) References Cited

U.S. PATENT DOCUMENTS

| | | | |
|---|---|---|---|
| 4,092,158 A | 5/1978 | Beyer et al. | |
| 4,235,630 A | 11/1980 | Babi | |
| 4,389,439 A | 6/1983 | Clark et al. | |
| 4,673,550 A | 6/1987 | Dallaire et al. | |
| 5,854,434 A * | 12/1998 | Saito et al. | 75/244 |
| 6,156,443 A | 12/2000 | Dallaire et al. | |
| 6,835,449 B2 | 12/2004 | Kim et al. | |
| 7,282,079 B2 | 10/2007 | Mizuno et al. | |
| 7,345,255 B2 | 3/2008 | Jiang et al. | |
| 2002/0017507 A1 | 2/2002 | North | |
| 2006/0053967 A1 | 3/2006 | Mizuno et al. | |
| 2006/0185773 A1 | 8/2006 | Chiovelli | |
| 2010/0018611 A1* | 1/2010 | Timur et al. | 148/241 |

FOREIGN PATENT DOCUMENTS

| | | |
|---|---|---|
| CA | 1110881 | 10/1981 |
| CA | 1253717 | 5/1989 |
| CA | 2409880 | 4/2004 |
| CA | 2266814 | 9/2007 |
| CN | 1843681 | 6/2009 |
| JP | 2004010974 | 1/2004 |
| JP | 2004027289 | 1/2004 |
| JP | 2005120457 | 5/2005 |
| KR | 900002196 | 4/1990 |

OTHER PUBLICATIONS

Novakova et al., "Electron-beam boriding of low-carbon steel," J. Alloys and Compounds, vol. 383, 2004 (no month), pp. 108-112.*
Hlawka et al., "Laser Surface Alloying . . . ," Advanced Engineering Materials, vol. 5, 2003 (no month), pp. 641-647.*

* cited by examiner

*Primary Examiner* — Michael La Villa
(74) *Attorney, Agent, or Firm* — France Côté; Benoît & Côté, Associés Inc.

(57) ABSTRACT

The present document describes a composite material adapted to resist degradation by an erosive agent. The composite material comprises a steel base and crystals embedded in the steel base. At least 50% of the crystals have an elongated portion. Optionally, the composite material comprises an external surface for exposure to the erosive agent. At least 50% of the elongated portions are transverse to the external surface. A filler material is also described for forming the composite material on a ferrous surface by welding. The filler material comprises iron, carbon, boron, molybdenum and silicon. Methods are also described form forming the composite material.

4 Claims, 25 Drawing Sheets

STEEL BASED COMPOSITE MATERIAL

CROSS-REFERENCE TO RELATED APPLICATIONS

This application is the first disclosure of this invention.

TECHNICAL FIELD

This description relates to the field of metallurgy. More particularly, this description relates to abrasion and erosion-resistant composite materials.

BACKGROUND

In many industries such as mining and oil sand, manipulation of erosive agents generates damages to manipulating devices such as piping, crusher and bucket of excavating machines. Erosive agents could be coke, coal, limestone, sand, kaolin and metal ores.

In order to increase the life of the manipulating devices, usual solutions consist of coating the surfaces exposed to the erosive agent with a resistant material. Many types of resistant material are used such as boron carbide, silicon carbide, tungsten carbide, nano-structured titanium, iron carbide, iron boride, ceramic particle, cemented metal carbide and several alloys. Many types of processes are used to coat the exposed surfaces as PTA (Plasma Transferred Arc), thermal spray, MIG welding process and sintering process. Excepted MIG welding, these processes are rather expensive to operate. Moreover the efficiencies of such produced overlays vary depending on parameters such as the type of erosive agent, the impact angle and the temperature.

There is therefore a need for improved resistant materials and for an easier process to overlay an exposed surface.

SUMMARY

According to an aspect, there is provided a composite material which comprises from more than 0% to 40% by volume of a steel base and from 60% to less than 100% by volume of crystals. The crystals are embedded in the steel base. At least 50% of the crystals have an iron boride ($Fe_2B$) crystalline structure. At least 50% of the crystals have an elongated portion. Optionally, at least 50% of the elongated portions are substantially parallel to each other.

According to another aspect, there is provided a composite material adapted to resist degradation by an erosive agent. The composite material comprises a steel base and crystals embedded in the steel base. At least 50% of the crystals have an elongated portion. Optionally, the composite material further comprises an external surface for exposure to the erosive agent. At least 50% of the elongated portions are transverse to the external surface.

According to another aspect, there is provided a coated ferrous surface adapted to resist degradation by an erosive agent. The coated ferrous surface comprises a ferrous surface and a composite material coating the ferrous surface. The composite material has a steel base, an external surface for exposure to the erosive agent and crystals embedded in the steel base. At least 50% of the crystals have an elongated portion.

According to another aspect, there is provided a filler material for welding on a ferrous surface for increasing the resistance to degradation of the ferrous surface by an erosive agent. The filler material comprises iron, carbon, boron, molybdenum and silicon.

According to another aspect, there is provided a method for forming a composite material on a surface for increasing the resistance to degradation of the surface by an erosive agent. The method comprises providing a composite material. The composite material comprises a steel base and crystals embedded in the steel base. At least 50% of the crystals have an elongated portion. The method further comprises fixing the composite material on the surface.

According to another aspect, there is provided a method for forming a composite material on a ferrous surface for increasing the resistance to degradation of the ferrous surface by an erosive agent. The method comprises providing a filler material comprising steel, boron, molybdenum, carbon and silicon. The method further comprises welding the filler material on the ferrous surface by depositing the filler material on the ferrous surface in a zigzag manner.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
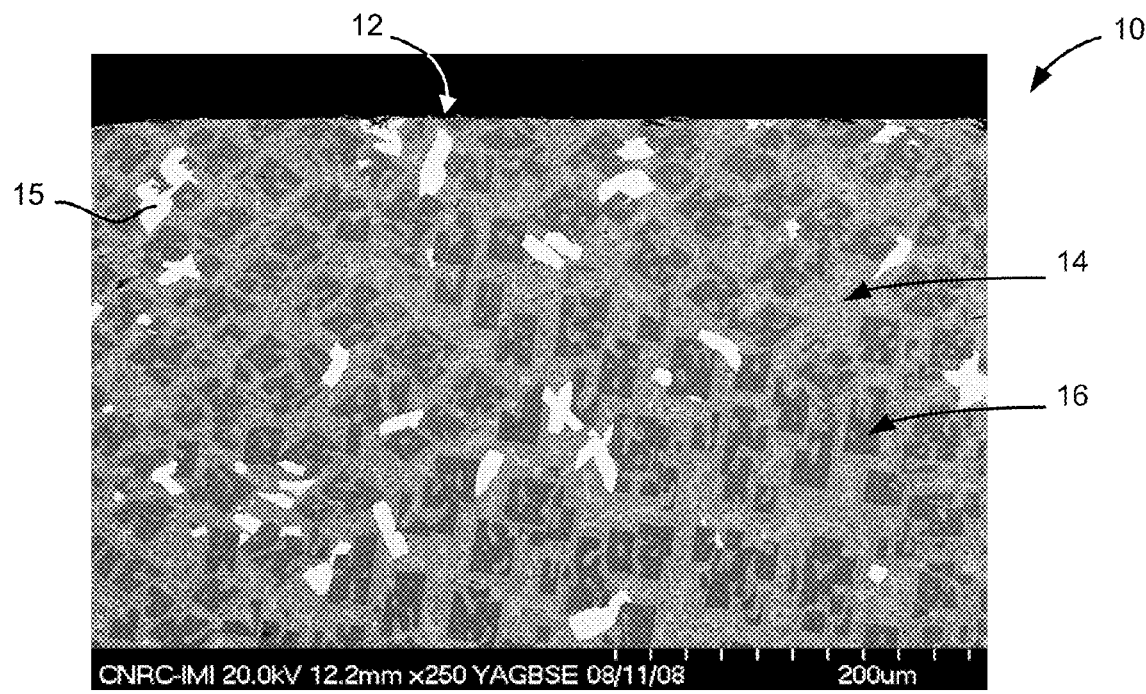
FIG. 1a is a scanning electron micrograph of a cross-section of a composite material 10, in accordance with an embodiment.
Figure 1B:
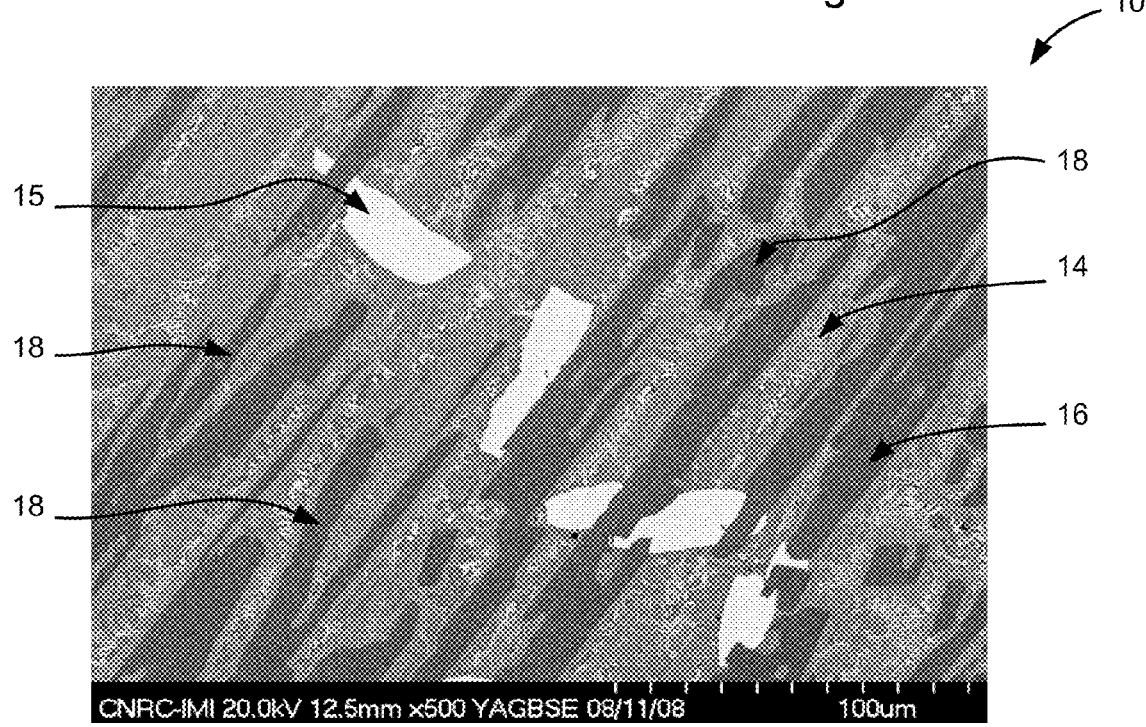
FIG. 1b is a scanning electron micrograph of an external surface of the composite material 10.

Referring now to the drawings, and more particularly to FIG. 1a & FIG. 1b, concurrently referred to, there are shown, respectively, a scanning electron micrograph of a cross section (FIG. 1a) and of an external surface 12 (FIG. 1b) of a composite material 10 according to an embodiment. The cross section is normal to the external surface 12. The composite material 10 was obtained by welding a cored wire, namely a filler material, on a steel surface, namely a ferrous surface. Studies and measurements were conducted about the composite material 10 and determined its composition: from more then 0% to 40% by volume and more specifically from 25% to 40% by volume of a steel base 14; from 60% to less than 100% by volume and more specifically from 60% to 75% by volume of crystals 16, the crystals 16 are embedded in the steel base 14, at least 50% of the crystals 16 have of an iron boride ($Fe_2B$) crystalline structure, at least 50% of the crystals 16 are columnar, at least 50% of the crystals 16 have an elongated portion 18; and at least 50% of the elongated portions 18 are substantially parallel to each other. The steel base 14 is presumed to have at least 50% of bainite.

At least 50% of the elongated portions 18 are substantially parallel to the external surface 12. The average diameter of the elongated portions 18 is about 20-30 μm. The composite material 10 contains large molybdenum-rich precipitates 15.

It has been unexpectedly discovered that it is possible to make a composite material comprising a high rate of oriented columnar iron boride crystals embedded in a bainitic steel base. Hardness and magnetic qualities of Iron boride crystals are well known. Strength of bainite is well known too. It is expected that such composites will possess high mechanical and magnetic qualities.

Figure 2A:
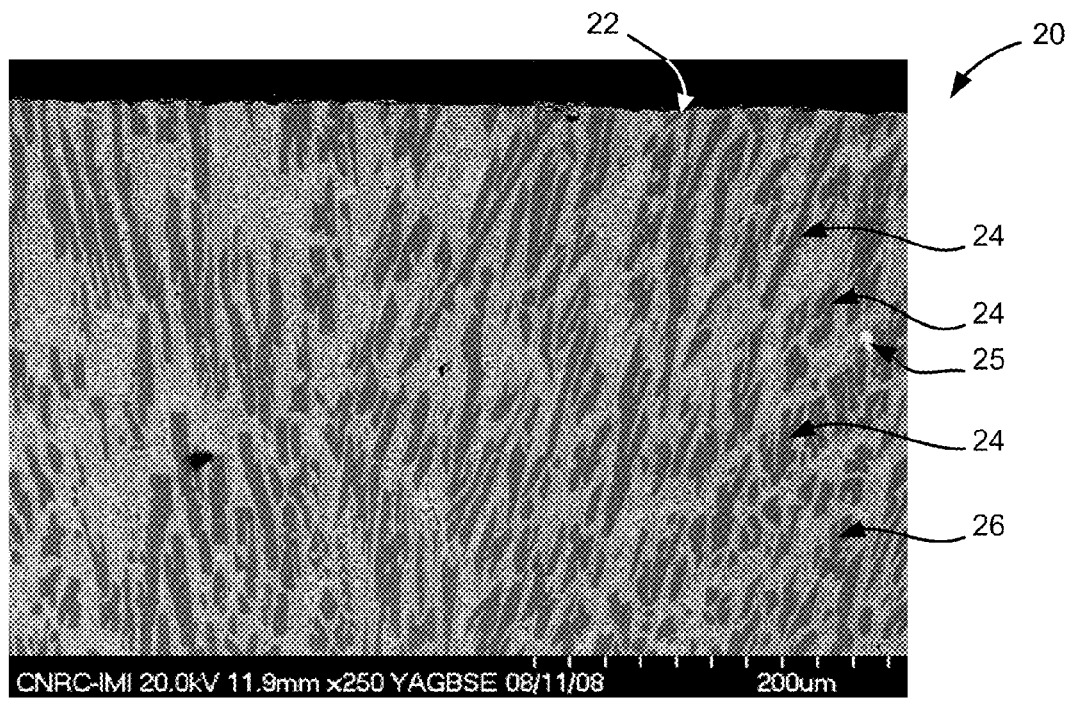
FIG. 2a is a scanning electron micrograph of a cross-section of a composite material 20, in accordance with another embodiment.
Figure 2B:
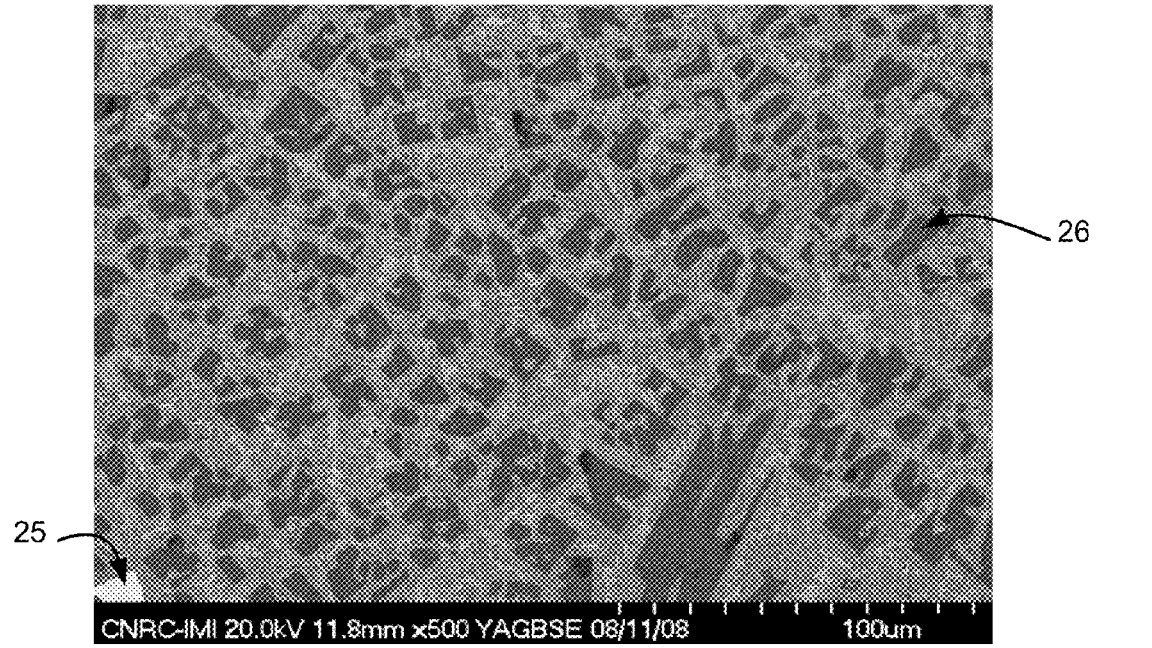
FIG. 2b is a scanning electron micrograph of an external surface of the composite material 20.

Turning now to FIG. 2b & FIG. 2b, concurrently referred to, there are shown, respectively, a scanning electron micrograph of a cross section (FIG. 2a) and of an external surface 22 (FIG. 2b) of another composite material 20 according to another embodiment. The cross section is normal to the external surface 22. This composite material 20 was obtained in the same manner as the composite material 10 by welding a cored wire on a steel surface but with different parameters. Studies and measurements determined a similar composition as those of the composite material 10. But we observe than at least 50% of elongated portion 24 of crystals 26 are transverse to the external surface 22. The average diameter of the elongated portions is about 10 μm. Also, the composite material 20 contains rare molybdenum-rich precipitates 25.

It has been unexpectedly discovered that it is possible to choose a major orientation of the elongated portion of the crystals embedded in a steel base. It is expected that mechanical and magnetic qualities of such composites will vary depending on the orientation of the elongated portions.

Composite material 10 and composite material 20 were both obtained by welding. Cored wires were deposited using the Gas Metal Arc Welding (GMAW) process with a Miller Invision 456 P DC Inverter Arc Welder. Wire was fed with a Miller 60 Series 24V wire feeder and displacement and oscillation of the welding torch was carried out with a Gullco oscillator KAT. Cored wires comprise an iron based sleeve in which powders of carbon, boron, molybdenum or silicon are inserted.

Figure 3:
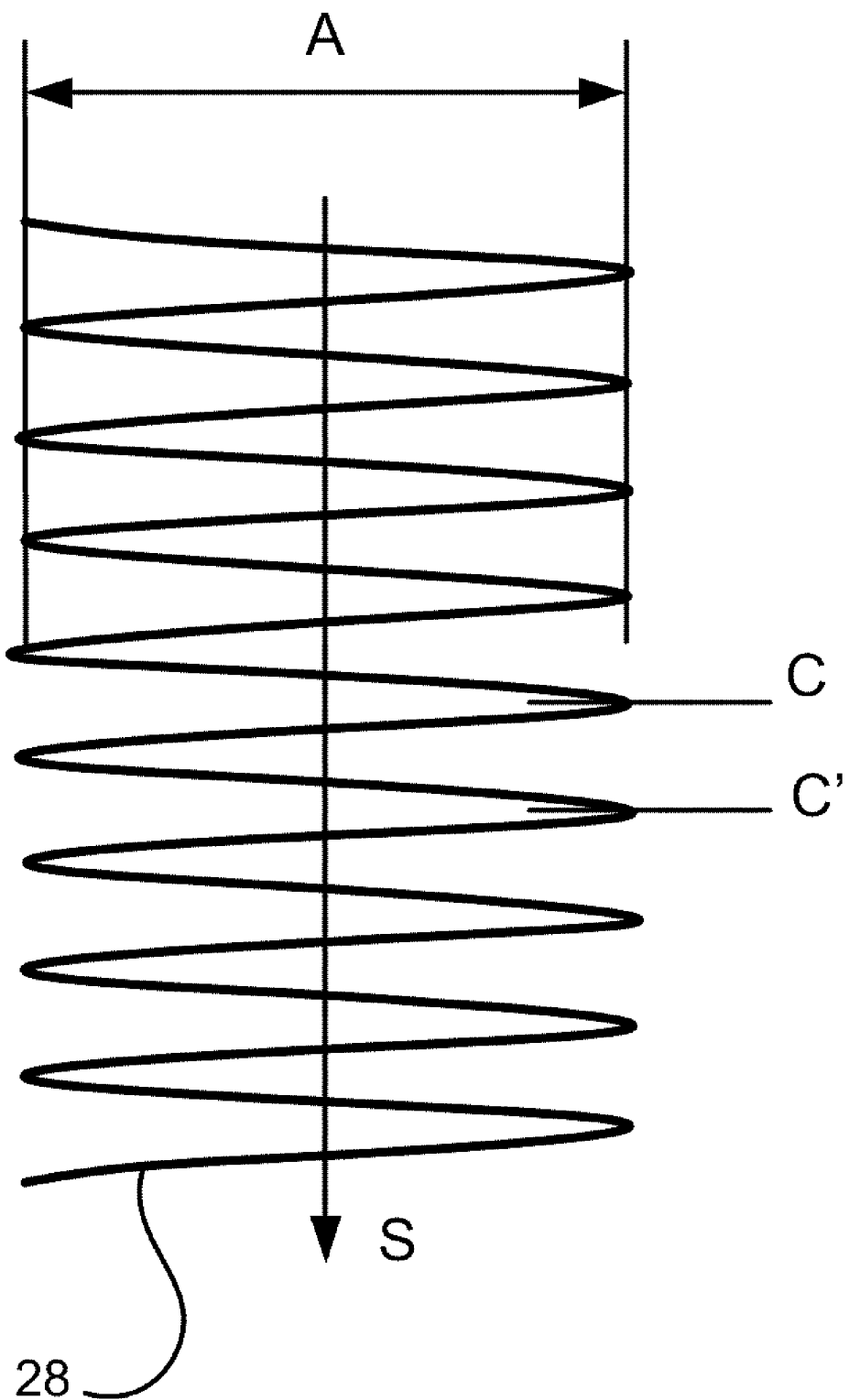
FIG. 3 is a scheme showing a generic pattern of a deposit sweep, in accordance with an embodiment.
Figure 4:
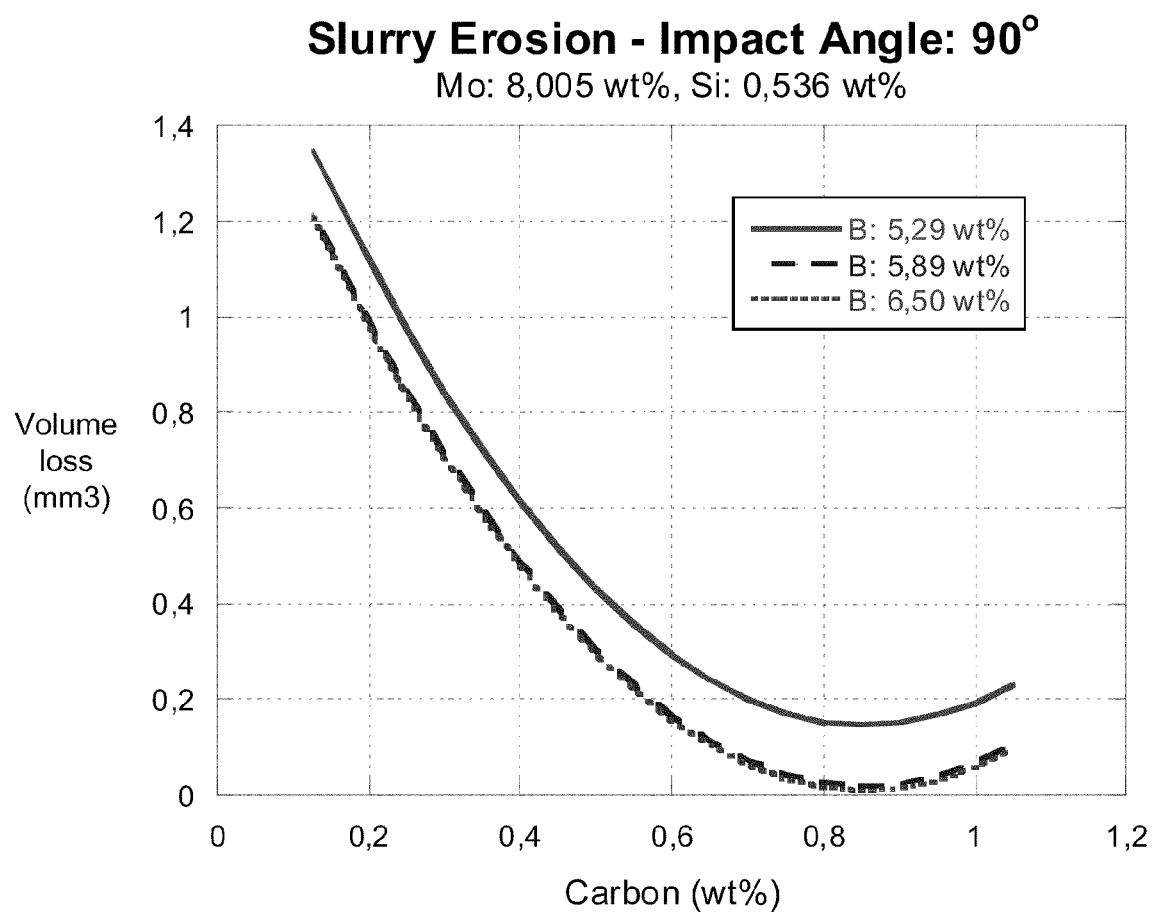
FIG. 4 is a graph showing an influence of carbon concentration on the slurry erosion resistance at the impact angle of 90° for boron concentration of 5.29, 5.89 and 6.50 wt %.

Concurrently referring to FIG. 3, there is shown a generic pattern of a deposit sweep 28 done on a steel surface of a substrate, not shown, by the devices previously described. The deposit sweep 28 is a continuous pass of the welding torch on the steel surface in a zigzag manner. The deposit sweep 28 is characterized by an oscillation amplitude A, a displacement speed S of the welding torch and an oscillation speed defined by a number of oscillation cycles of the welding torch in a given period. One oscillation cycle corresponds to the portion of the deposit sweep 28 comprised between C and C'.

The composite material 10 and the composite material 20 were obtained in successive deposit sweeps. The deposition conditions and the steel substrate thickness are shown in Table 1. Composite material 10, having an oscillation amplitude of 1½ inch, was obtained by depositing two parallel successive sweeps followed by two superposed parallel successive sweeps. Composite material 20, having an oscillation amplitude of ¾ inch, was also obtained by depositing two parallel successive sweeps followed by two superposed parallel successive sweeps. After naturally cooling to room temperature, the overlays were sectioned with a water jet cutting system as to obtain specimens 1 inch wide×7½ inch length. This procedure avoids changes in overlay microstructure contrary to other cutting processes such as arc or PTA cutting. The required test samples were subsequently cut with diamond saw.

The composite material 10 and the composite material 20 are obtained with cored wires having the same chemical composition (6.14 B-9.48 Mo-1.02 C-0.77 Si and the remaining 82.47 Fe), the total alloying elements being 17.41 wt. %. The diameter of the cored wires was about 1.60 mm.

TABLE 1

Deposition parameters for composite materials.

| Composite material number | Substrate Thickness (inch) | Arc Voltage (V) | Wire Feed Rate (inch/minute) | Torch Speed S (inch/minute) | Oscillation Amplitude A (inch) | Oscillation Speed (cycle/minute) |
|---|---|---|---|---|---|---|
| 20 | ¼ | 23 | 150 | 5⅝ | ¾ | 52 |
| 10 | 1 | 25 | 150 | 1 | 1½ | 48 |

It has been unexpectedly discovered that it is possible to make a composite material comprising a high rate of oriented columnar iron boride crystals embedded in a bainitic steel base and to choose a major orientation of the elongated portions of the crystals with common industrial devices.

Returning to the methods to make a composite material comprising a high rate of iron boride crystals embedded in a bainitic steel base, the metallographic micro-structure highly depends on the melting and solidification processes. Provided that the filler material is appropriately melted and supplied to the substrate surface, deposition parameters favouring low power and a smaller melt pool which is maintained liquid for a time which is sufficient to form and align crystals transversely to the external surface as in the composite material 20. Larger oscillation amplitudes and smaller torch speeds result in larger melt pool in which larger crystals are formed almost aligned parallel with the external surface as in the composite material 10. Also, with a still larger melt pool and a smaller thermal gradient, crystals form with an equiaxed structure different from the columnar structure.

In each case, according to the excepted qualities, parameters of melting and solidification must be adapted. There are many combinations of correct parameters to achieve each objective. Parameters are interdependent. Starting from a correct combination, if we change one parameter, we must change also others parameters to obtain the same qualities. For example, starting from the parameters shown in Table 1 for obtaining the composite material 20, if the wire feed rate is increased the torch speed should be also increased. Lowering the wire feed rate results in thinner overlays, the other parameter being kept constant.

The composite material 20 was obtained on a steel surface and on a stainless steel surface as well, with specifics parameters of melting. It is envisioned to obtain the composite material 20 on others ferrous surface made of carbon steel, stainless steel, maraging steel, alloy steel, tool steel, cast iron, ductile iron and wrought iron, forming coated ferrous surfaces.

One expected application is to apply an overlay of such composite material for protecting ferrous surfaces from erosive agents. The ferrous surfaces include ducts and components used to handle and process erosive agents. Erosive agents include slurries containing ores or other minerals such as sand or other dry erosive agents. Erosive agents include slurries containing coke, coal, metal ores or other minerals such as sand, limestone, kaolin or other dry erosive agents.

Although the resistances of overlays of the composite material 10 and of the composite material 20 were evaluated by wear tests in the case of abrasion, slurry erosion at impact angle of 30° and 90°, and dry erosion at impact angles of 25° and 90° and temperatures of 25° C. and 315° C. were also evaluated. Results are shown in Table 2.

The abrasion wear resistance of overlays was also measured in accordance with the Dry Sand/Rubber Wheel Abrasion Test (ASTM G65, Procedure A) discussed in "Standard Method for Measuring Abrasion Using the Dry Sand/Rubber Wheel Apparatus G 65, Annual book of ASTM Standards, Part 3, ASTM, 1992, pp. 239-251". The testing method consists in abrading a specimen with a grit of controlled size and composition. A force of 130 N maintained the specimen against the rubber-coated wheel. Quartz sand (50/70 mesh) (300 μm/212 μm) was introduced between the specimen and the wheel at a flow ranging between 4 and 6 g/s. The wheel rotates in the same direction as the flowing sand and the test ended after 6000 revolutions.

Slurry erosion tests were carried out using a slurry jet erosion device. Not being a standardized procedure, the test consists in circulating 12 liters of prepared slurry during 2 hours using an air-powered double-diaphragm slurry pump. The re-circulating slurry, consisting of filtered 15-20° C. tap water with 15 wt % 212-300 μm quartz sand particles, was pumped from a tank and forced to impinge on the test surface located at 10 cm from the exit of a 5 mm diameter alumina tube. The velocity of the slurry was measured to be 13 $ms^{-1}$. Specimens were maintained at 90° and 30° and exposed to the slurry jet for 2 hours. After each test, the slurry was replaced.

Dry erosion tests were carried out using the gas-blast method with a laboratory device described in U.S. Pat. No. 6,156,443.

Wear damage was evaluated with a laser profilometer. This apparatus allows measurements with accuracy greater than 99%. The profilometer is designed to measure minute volume losses and microscopic deformation. Volume losses are reported in $mm^3$.

TABLE 2

Wear test results for composite materials.

| Composite material number | Abrasion Volume Loss ($mm^3$) | Slurry Erosion α: 30° Volume Loss ($mm^3$) | Slurry Erosion α: 90° Volume Loss ($mm^3$) | Dry Erosion T: 25° C. α: 25° Volume Loss ($mm^3$) | Dry Erosion T: 25° C. α: 90° Volume Loss ($mm^3$) | Dry Erosion T: 300° C. α: 25° Volume Loss ($mm^3$) | Dry Erosion T: 300° C. α: 90° Volume Loss ($mm^3$) |
|---|---|---|---|---|---|---|---|
| 20 | 8.07 | 0.080 | 0.120 | 0.024 | 0.077 | 0.112 | 0.330 |
| 10 | 11.22 | 1.203 | 1.140 | 0.021 | 0.103 | 0.168 | 0.480 |

It has been unexpectedly discovered that in general the composite material 20 is more resistant than the composite material 10 and that the composite material 20 is about 10 times more resistant than the composite material 10 against slurry erosion at both impact angles of 30° and 90°. The orientation of the elongated portions 18, transverse to the external surface 12, is responsible of the high wear resistance, especially against slurry. The external surface 12, exposed to corrosive agents, presents the head of fine elongated portions 18 of crystals 16 surrounded by the material of the steel base 14.

Regarding the jump in the resistance against slurry erosion between the composite material 10 and the composite material 20, a comparison of the slurry erosion resistance of the composite material 20 with other commercial materials was carried out. The results are shown in Table 3.

The slurry erosion resistance of the composite material 20 at both impact angles of 30° and 90° is compared with different commercial materials. Table 3 shows that the composite material 20 is 340 times better than steel at the impact angle of 30° and 208 times better than steel at the impact angle of 90°. As compared with chromium carbide overlays currently used for preventing slurry erosion, the composite material 20 presents slurry erosion resistance at the impact angle of 30° 12-34 times better and at the impact angle of 90° 17-22 times better, depending upon the chromium carbide overlay thicknesses. In comparison with PTA WC—NiCrBSi overlays that are considered as the best materials for combating slurry erosion wear, the composite material 20 presents 5 to 6 times better wear performance depending on the impact angle.

It should be also observed that the slurry erosion resistance of the composite material 20 does not depend upon the overlay thickness. This means that the orientation of crystals perpendicularly to the external surface 12 starts at the very early stage of the deposition process.

A person skilled in the art can envision to produce a composite material 10 or a composite material 20 as previously described and to fix the composite material on a surface for increasing the resistance to degradation of the surface by an erosive agent. The fixing can be carried out by welding, sticking, screwing or other means.

TABLE 3

Comparison of the slurry erosion resistance of different commercial materials with the composite material 20.

| SAMPLE | Slurry Erosion α: 30° Volume Loss (mm³) | Slurry Erosion α: 90° Volume Loss (mm³) |
|---|---|---|
| Hot Rolled Carbon Steel (A36) | 26.89 | 20.70 |
| Chromium Carbide Overlay (thickness: 8-12 mm) | 0.960 | 1.694 |
| Chromium Carbide Overlay (thickness: 2-4 mm) | 2.736 | 2.226 |
| Plasma Transferred Arc WC-NiCrSiB (thickness; n.a.) | 0.420 | 0.580 |
| Composite material 20 (thickness: 5-6 mm) | 0.079 | 0.100 |
| Composite material 20 (thickness: 2-3 mm) | 0.083 | 0.111 |

Regarding to the noticeable resistance of the composite material 20 against various erosive agents, comparative tests of resistances against erosive agents depending on the composition of the cored wire was carried out.

Additional samples were obtained using welding parameters which ensure the formation of the composite material 20. The deposition parameters are shown in Table 4. The additional elements to these steel-based cored wires used for obtaining wear resistant overlays are depicted in Table 5.

TABLE 4

Deposition parameters for samples 529 to 572

| Sample | Substrate Thickness (inch) | Arc Voltage (V) | Wire Feed Rate (inch/minute) | Torch Speed S (inch/minute) | Oscillation Amplitude A (inch) | Oscillation Speed (cycle/minute) |
|---|---|---|---|---|---|---|
| 529-572 | 3/4 | 23 | 150 | 5 5/8 | 13/16 | 52 |

TABLE 5

Additional elements in steel-based cored wires.

| Sample | Boron Content Wt. % | Molybdenum Content Wt. % | Carbon Content Wt. % | Silicon Content Wt. % | Total Elements Wt. % |
|---|---|---|---|---|---|
| 572 | 5.96 | 9.29 | 1.01 | 0.71 | 16.97 |
| 570 | 5.78 | 10.38 | 0.96 | 0.19 | 17.31 |
| 569 | 5.62 | 5.67 | 0.94 | 0.14 | 12.37 |
| 568 | 6.18 | 9.32 | 0.92 | 0.75 | 17.17 |
| 564 | 6.15 | 9.39 | 0.93 | 0.20 | 16.67 |
| 560 | 5.29 | 8.78 | 0.58 | 0.84 | 15.49 |
| 559 | 6.12 | 8.86 | 0.77 | 0.23 | 15.97 |
| 553 | 6.10 | 8.90 | 0.89 | 0.90 | 16.79 |
| 549 | 6.50 | 7.62 | 0.93 | 0.47 | 15.52 |
| 548 | 6.21 | 9.10 | 1.05 | 0.79 | 17.15 |
| 547 | 5.97 | 9.07 | 1.02 | 0.76 | 16.81 |
| 546 | 5.85 | 9.23 | 1.01 | 0.76 | 16.84 |
| 545 | 5.67 | 9.29 | 0.94 | 0.77 | 16.67 |
| 544 | 6.40 | 9.14 | 0.91 | 0.57 | 17.03 |
| 543 | 6.13 | 9.41 | 0.84 | 0.58 | 16.96 |
| 541 | 6.25 | 9.36 | 0.91 | 0.75 | 17.28 |
| 540 | 6.25 | 8.92 | 0.84 | 0.58 | 16.58 |
| SYN014 | 6.31 | 9.74 | 1.05 | 0.79 | 17.90 |
| 538 | 6.07 | 8.79 | 0.81 | 0.21 | 15.89 |
| 537 | 5.92 | 8.62 | 0.77 | 0.93 | 16.23 |
| 536 | 5.93 | 8.87 | 0.77 | 0.75 | 16.31 |
| 535 | 5.78 | 9.44 | 0.13 | 0.74 | 16.09 |
| 534 | 6.49 | 9.07 | 0.86 | 0.23 | 16.65 |
| 533 | 5.95 | 6.91 | 0.62 | 0.75 | 14.24 |
| 532 | 5.71 | 7.98 | 0.68 | 0.91 | 15.28 |
| 531 | 5.86 | 5.63 | 0.55 | 0.91 | 12.95 |
| 529 | 6.20 | 9.31 | 0.84 | 0.22 | 16.57 |

The wear test results performed on these overlays samples 529 to 572 are summarized in table 6.

TABLE 6

Wear test results for samples 529 to 572

| Sample | Abrasion Volume Loss (mm³) | Slurry Erosion α: 30° Volume Loss (mm³) | Slurry Erosion α: 90° Volume Loss (mm³) | Dry Erosion T: 25° C. α: 25° Volume Loss (mm³) | Dry Erosion T: 25° C. α: 90° Volume Loss (mm³) | Dry Erosion T: 300° C. α: 25° Volume Loss (mm³) | Dry Erosion T: 300° C. α: 90° Volume Loss (mm³) |
|---|---|---|---|---|---|---|---|
| 572 | 7.29 | 0.095 | 0.143 | 0.011 | 0.050 | 0.108 | 0.303 |
| 570 | 7.75 | 0.105 | 0.150 | 0.025 | 0.068 | 0.155 | 0.343 |
| 569 | 7.86 | 0.156 | 0.222 | 0.042 | 0.121 | 0.172 | 0.470 |
| 568 | 7.27 | 0.122 | 0.261 | 0.005 | 0.018 | 0.153 | 0.356 |
| 564 | 9.57 | 0.145 | 0.160 | 0.012 | 0.055 | 0.110 | 0.317 |
| 560 | 10.80 | 0.268 | 0.415 | 0.058 | 0.138 | 0.219 | 0.616 |
| 559 | 7.60 | 0.168 | 0.102 | 0.010 | 0.060 | 0.098 | 0.293 |
| 553 | 7.11 | 0.127 | 0.131 | 0.015 | 0.044 | 0.074 | 0.306 |
| 549 | 7.22 | 0.115 | 0.342 | 0.008 | 0.033 | 0.072 | 0.266 |
| 548 | 7.56 | 0.150 | 0.219 | 0.010 | 0.065 | 0.104 | 0.273 |
| 547 | 7.73 | 0.193 | 0.118 | 0.010 | 0.079 | 0.115 | 0.360 |
| 546 | 7.88 | 0.164 | 0.178 | 0.029 | 0.067 | 0.106 | 0.338 |
| 545 | 8.15 | 0.176 | 0.233 | 0.020 | 0.078 | 0.134 | 0.391 |
| 544 | 7.56 | 0.171 | 0.133 | 0.017 | 0.057 | 0.097 | 0.307 |
| 543 | 7.47 | 0.128 | 0.094 | 0.016 | 0.066 | 0.097 | 0.372 |
| 541 | 7.57 | 0.133 | 0.168 | 0.005 | 0.045 | 0.075 | 0.329 |
| 540 | 7.34 | 0.112 | 0.245 | 0.021 | 0.044 | 0.126 | 0.260 |
| SYN014 | 7.97 | 0.108 | 0.221 | 0.021 | 0.045 | 0.125 | 0.409 |
| 538 | 8.91 | 0.236 | 0.207 | 0.026 | 0.091 | 0.153 | 0.345 |
| 537 | 8.14 | 0.134 | 0.247 | 0.014 | 0.076 | 0.093 | 0.430 |
| 536 | 8.31 | 0.242 | 0.154 | 0.022 | 0.068 | 0.123 | 0.339 |
| 535 | 9.88 | 0.893 | 1.368 | 0.013 | 0.106 | 0.173 | 0.406 |
| 534 | 7.29 | 0.106 | 0.135 | 0.013 | 0.040 | 0.062 | 0.238 |
| 533 | 10.31 | 0.132 | 0.430 | 0.072 | 0.104 | 0.135 | 0.493 |
| 532 | 9.97 | 0.119 | 0.212 | 0.050 | 0.114 | 0.165 | 0.554 |
| 531 | 9.22 | 0.297 | 0.241 | 0.028 | 0.092 | 0.103 | 0.383 |
| 529 | 8.66 | 0.001 | 0.193 | 0.017 | 0.026 | 0.110 | 0.287 |

The influence of addition elements (B, Mo, C, Si) on the slurry erosion resistance, abrasion resistance and dry erosion resistance at T: 25° C. and 300° C. was derived using regression analysis and are depicted in FIGS. 3 to 22.

Figure 5:
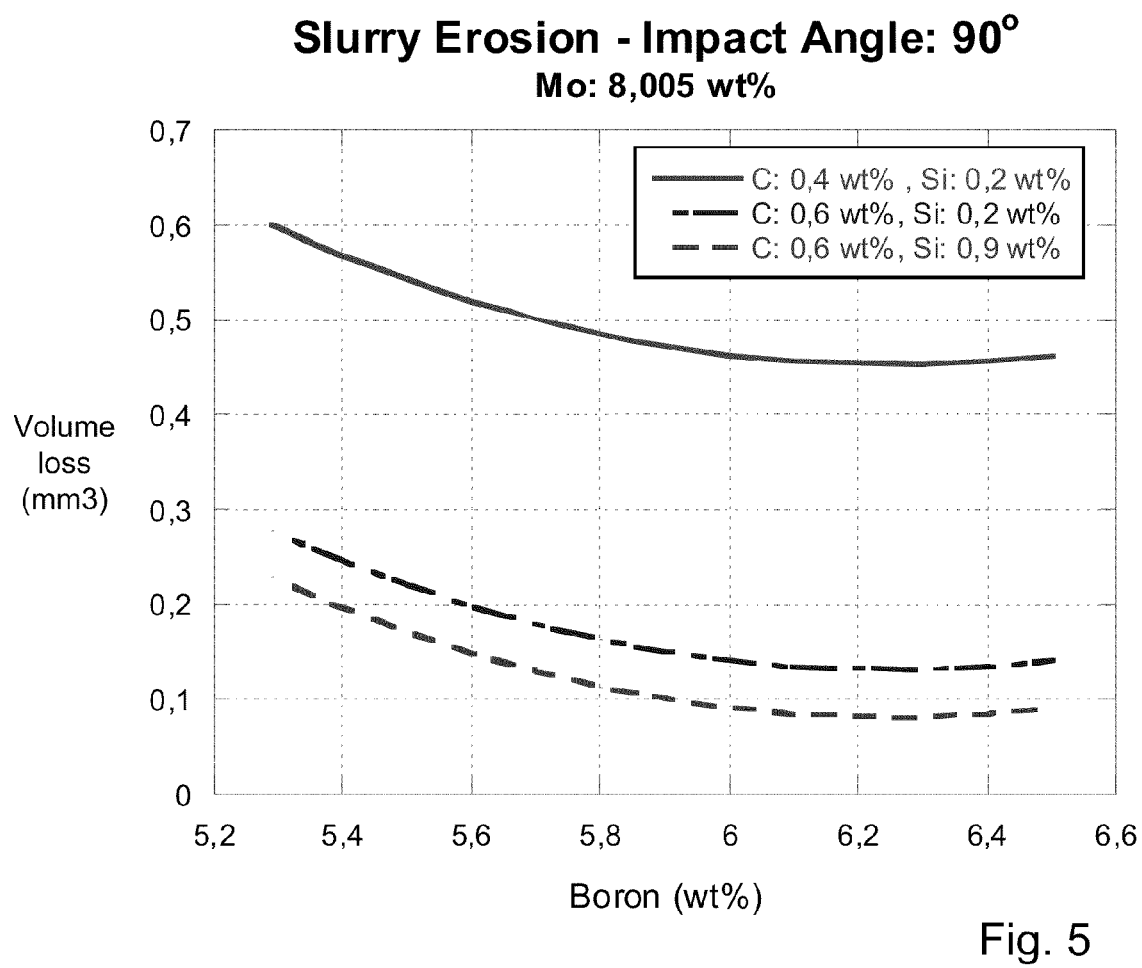
FIG. 5 is a graph showing an influence of boron concentration on the slurry erosion resistance at the impact angle of 90° for carbon concentration of 0.4 and 0.6 wt % and silicon concentration of 0.2 and 0.9 wt %.
Figure 6:
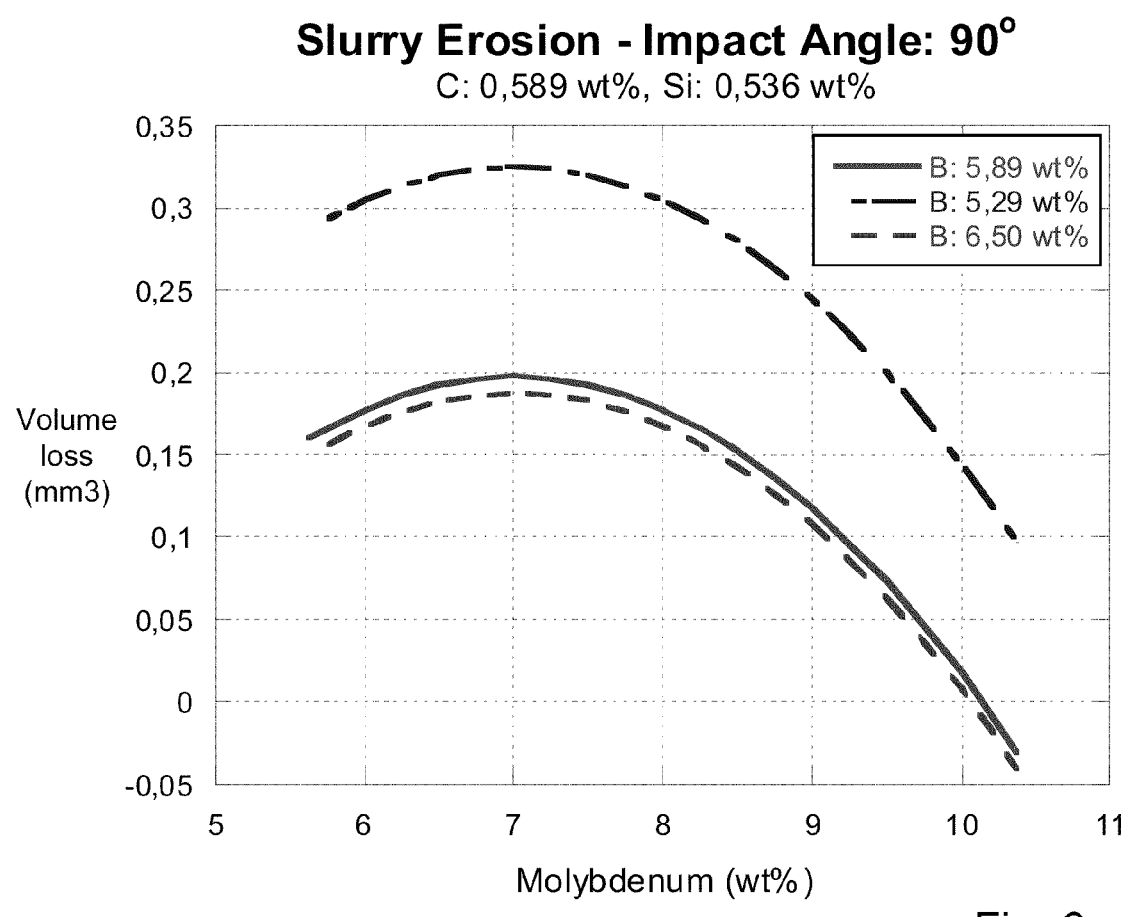
FIG. 6 is a graph showing an influence of molybdenum concentration on the slurry erosion resistance at the impact angle of 90° for boron concentration of 5.29, 5.89 and 6.50 wt %.
Figure 7:
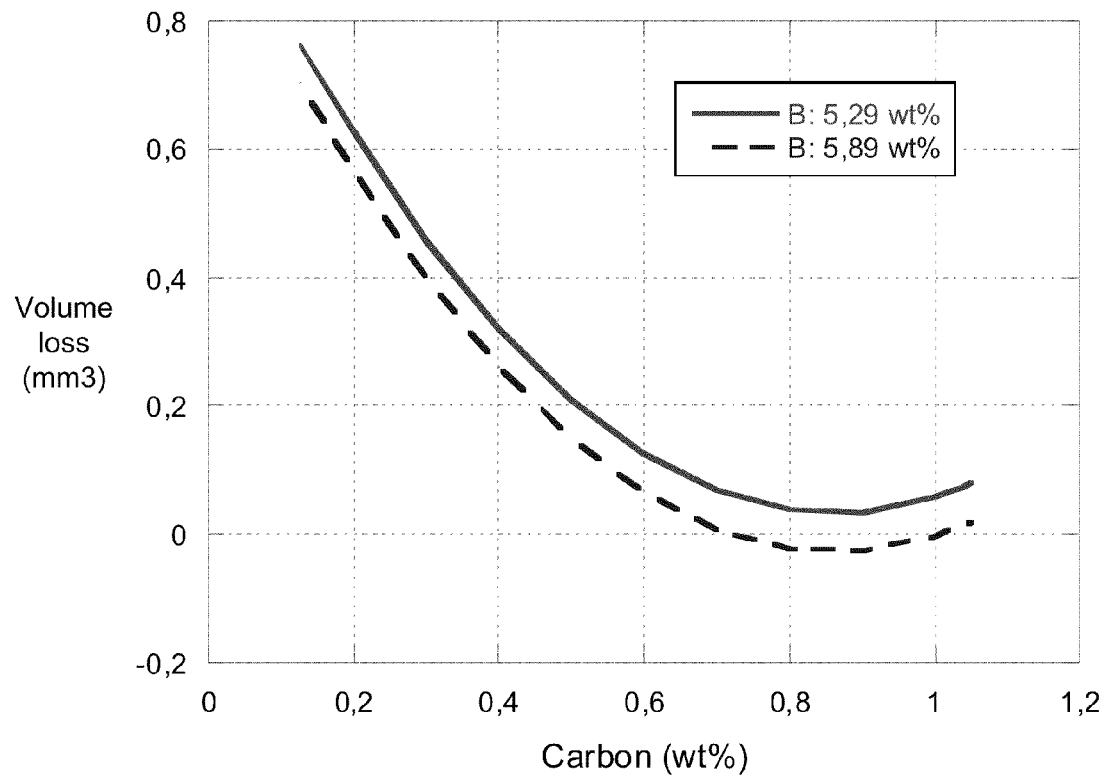
FIG. 7 is a graph showing an influence of carbon concentration on the slurry erosion resistance at the impact angle of 30° for boron concentration of 5.29 and 5.89 wt %.
Figure 8:
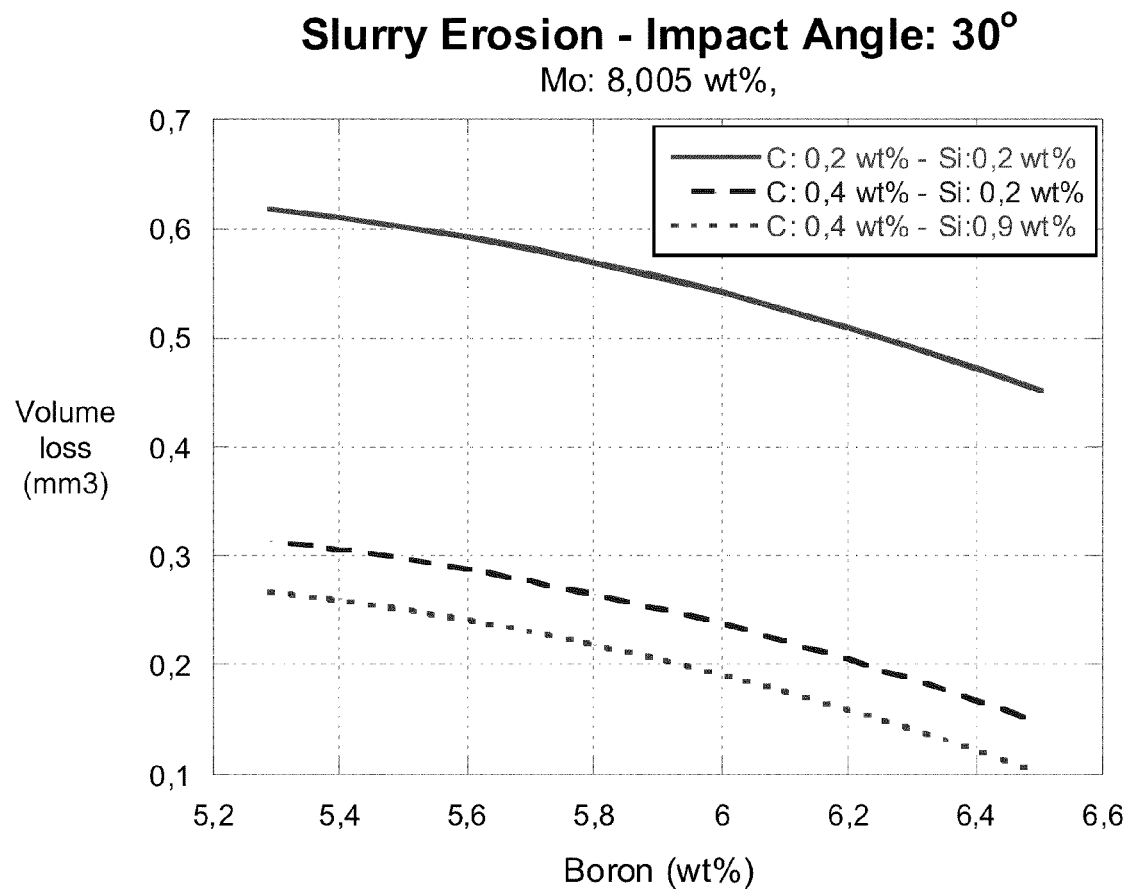
FIG. 8 is a graph showing an influence of boron concentration on the slurry erosion resistance at the impact angle of 30° for carbon concentration of 0.2 and 0.4 wt % and silicon concentration of 0.2 and 0.9 wt %.

Discussion about Slurry Erosion Resistance: As observed in FIGS. 4 and 7 the carbon concentration has a marked influence on the slurry erosion resistance at both impact angles of 30° and 90°. The highest slurry erosion resistance for both impact angles of 30° and 90° is reached at the carbon concentration of 0.85 wt %. The molybdenum concentration contributes to increase the slurry erosion resistance at the impact angle of 90° when it exceeds 8.5 wt % (FIG. 6). No measurable effect of this element on the slurry erosion resistance at the impact angle of 30° can be observed. Increasing the boron concentration increases the slurry erosion resistance at both impact angles (FIGS. 5 and 8). However, slurry erosion resistance at the impact angle of 90° reaches a maximum at the boron concentration of 6.2 wt % (FIG. 5). On the contrary, the slurry erosion resistance at the impact angle of 30° increases as the boron concentration increases (FIG. 8). Silicon also contributes to increase the slurry erosion resistance at both impact angles but has a lesser importance than other additional elements (FIGS. 5 and 8). The silicon concentration has to be higher than 0.65 wt % in order to observe a noticeable effect.

Figure 9:
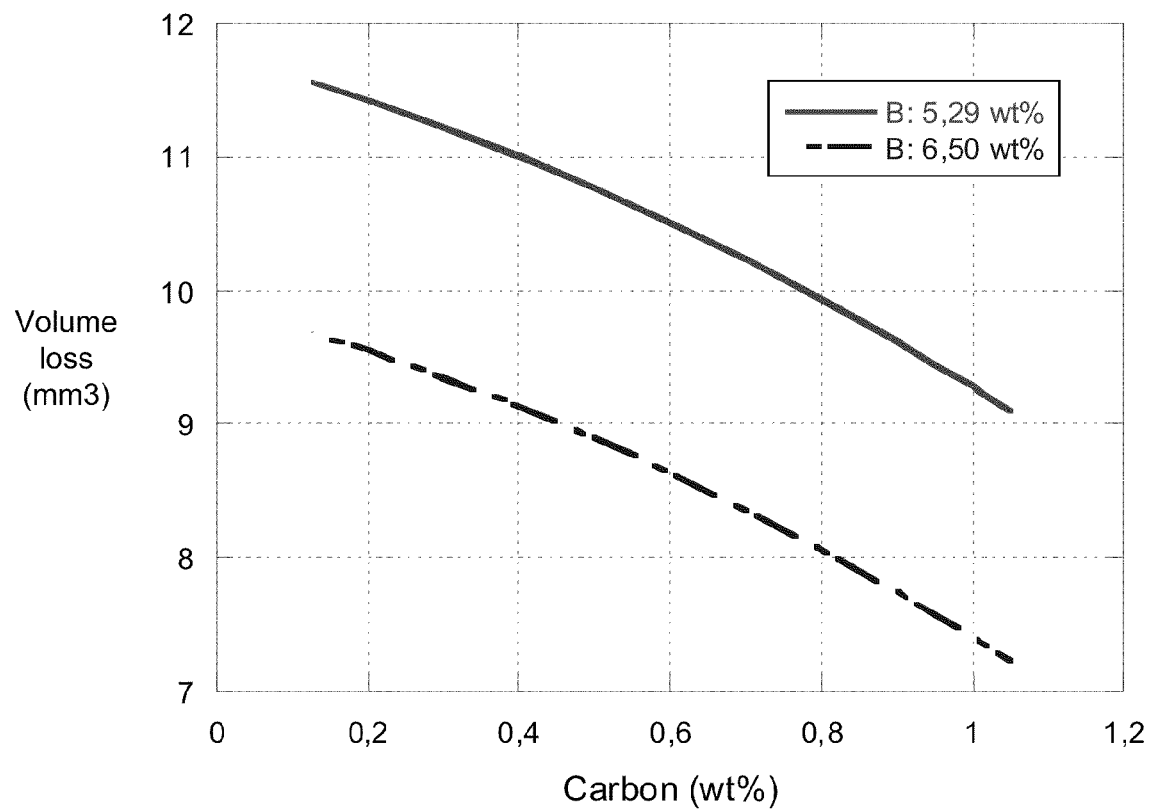
FIG. 9 is a graph showing an influence of carbon concentration on the abrasion resistance for boron concentration of 5.29 and 6.50 wt %.
Figure 10:
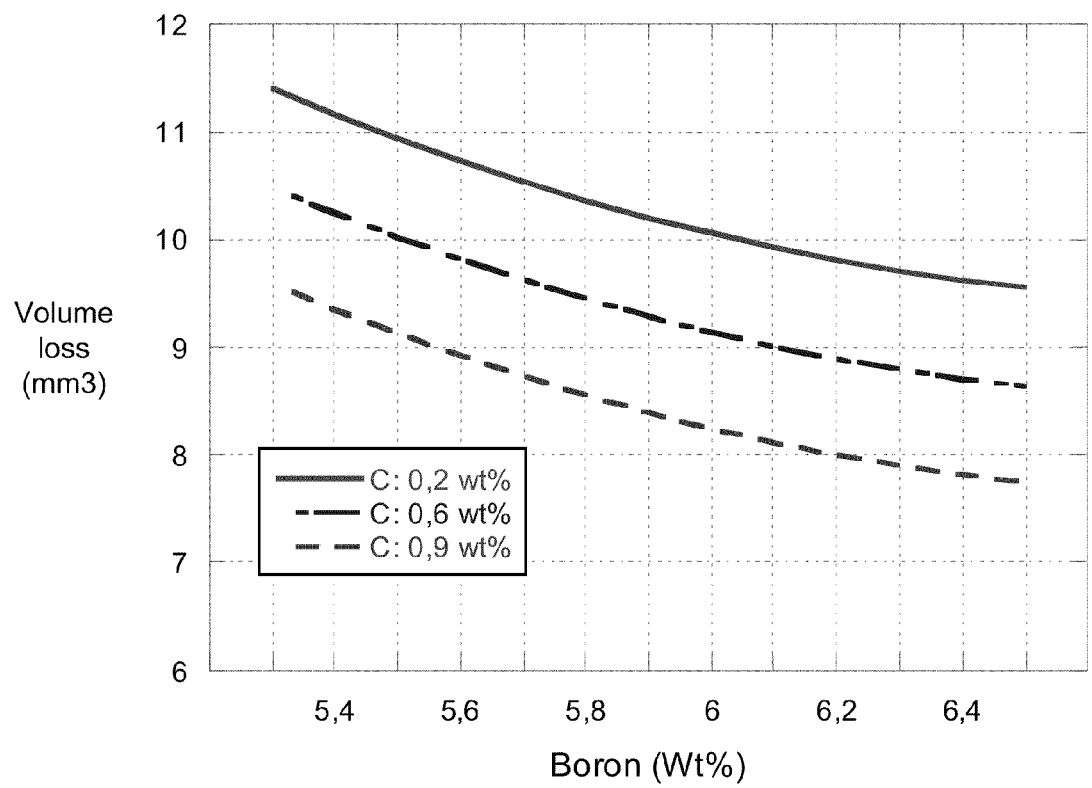
FIG. 10 is a graph showing an influence of boron concentration on the abrasion resistance for carbon concentration of 0.2, 0.6 and 0.9 wt %.
Figure 11:
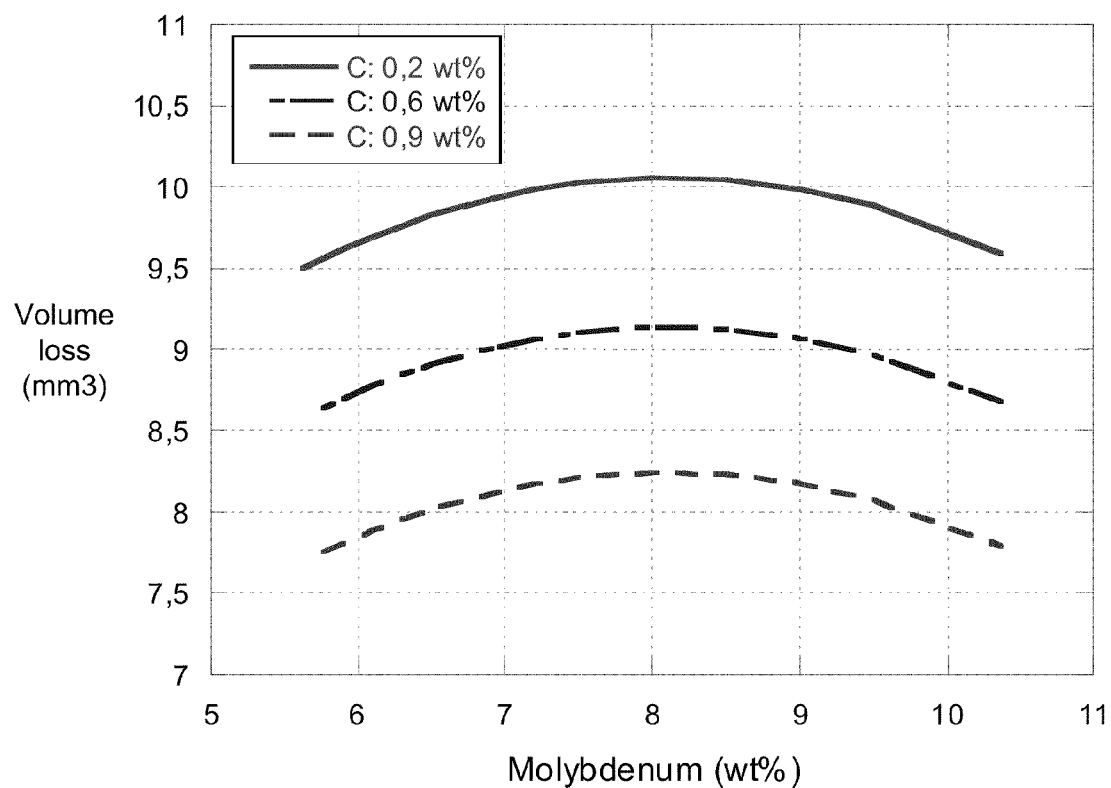
FIG. 11 is a graph showing an influence of molybdenum concentration on the abrasion resistance for carbon concentration of 0.2, 0.6 and 0.9 wt %.

Discussion about Abrasion Resistance: Increasing the boron and carbon concentration increases the abrasion resistance of overlays but to a lesser extent than observed for slurry erosion resistance (FIGS. 9 and 10). Silicon has no noticeable effect on the abrasion resistance. The abrasion resistance is higher at the molybdenum concentrations of 5.63 wt % and 10.4 wt % (FIG. 11).

Figure 12:
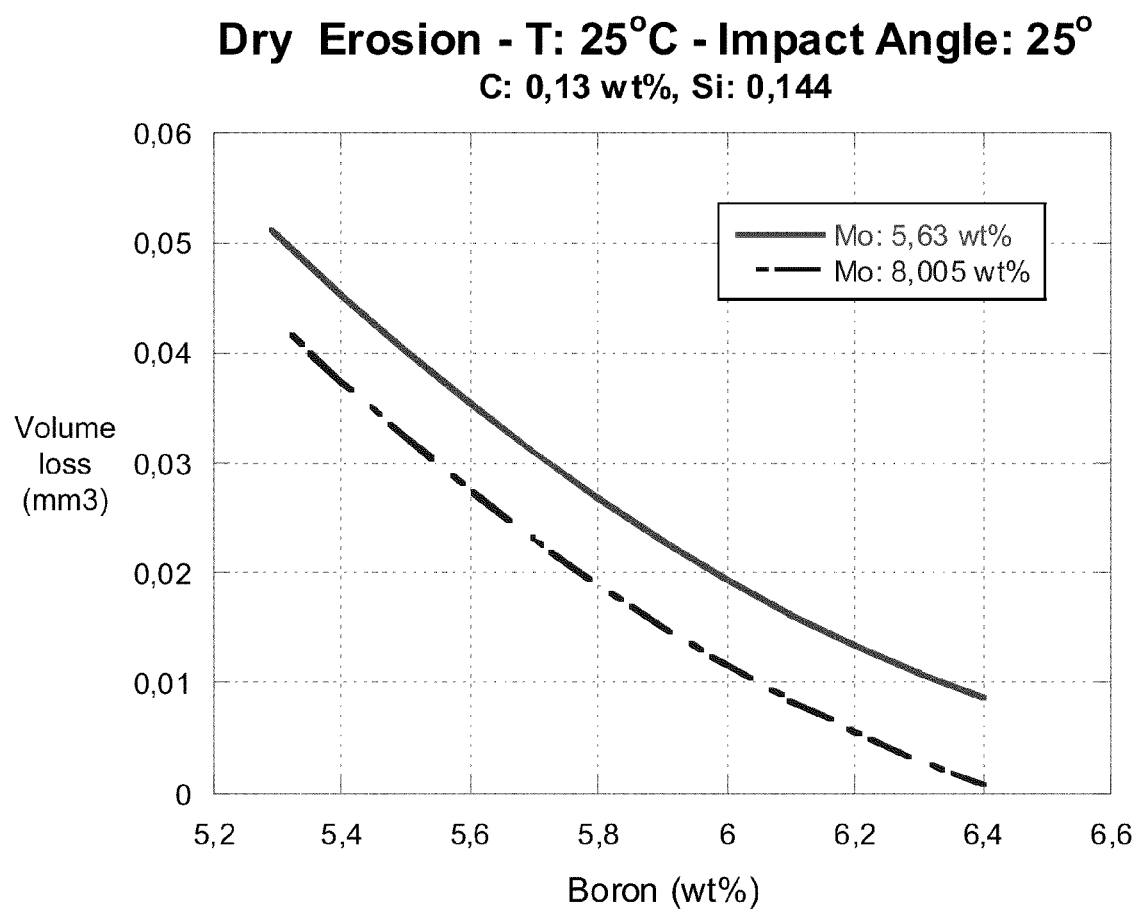
FIG. 12 is a graph showing an influence of boron concentration on the dry erosion resistance at T: 25° C. and the impact angle of 25° for molybdenum concentration of 5.63 and 8.005 wt %.
Figure 13:
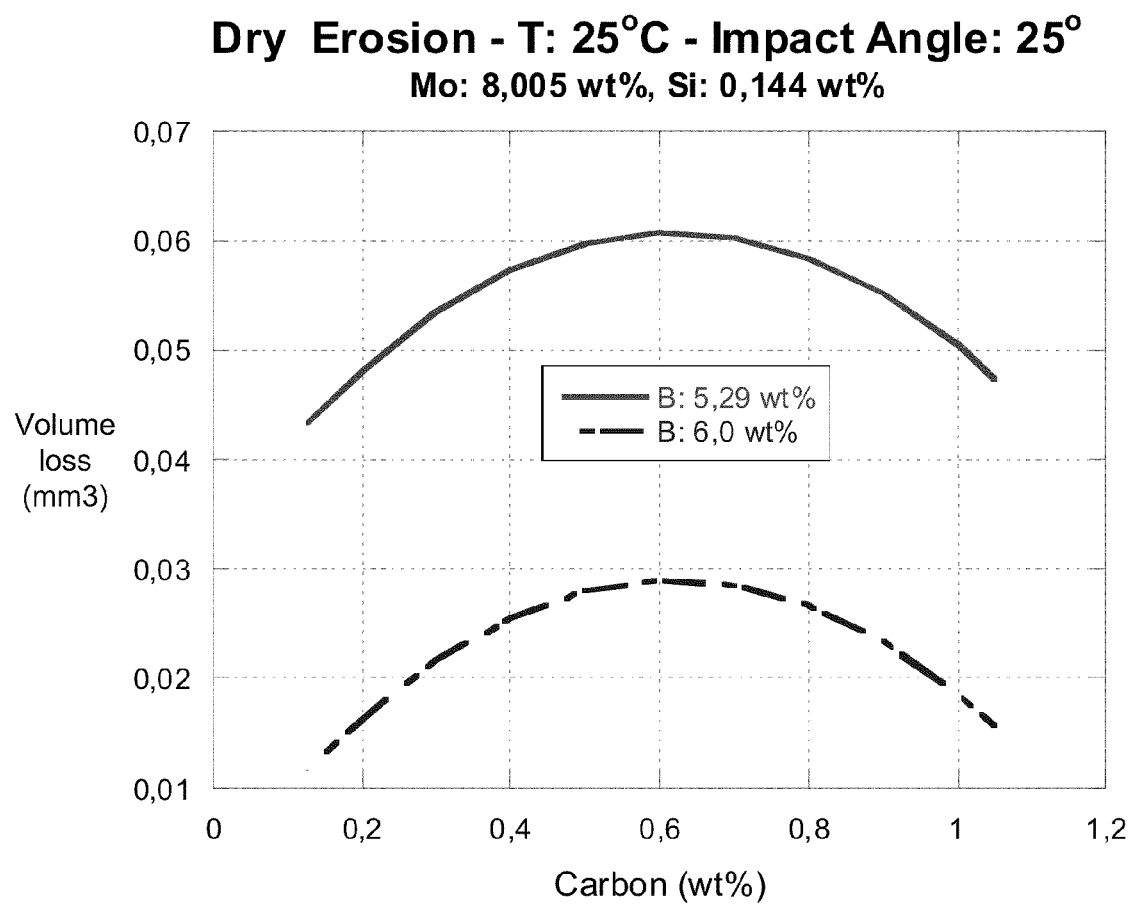
FIG. 13 is a graph showing an influence of carbon concentration on the dry erosion resistance at T: 25° C. and the impact angle of 25° for boron concentration of 5.29 and 6.0 wt %.
Figure 14:
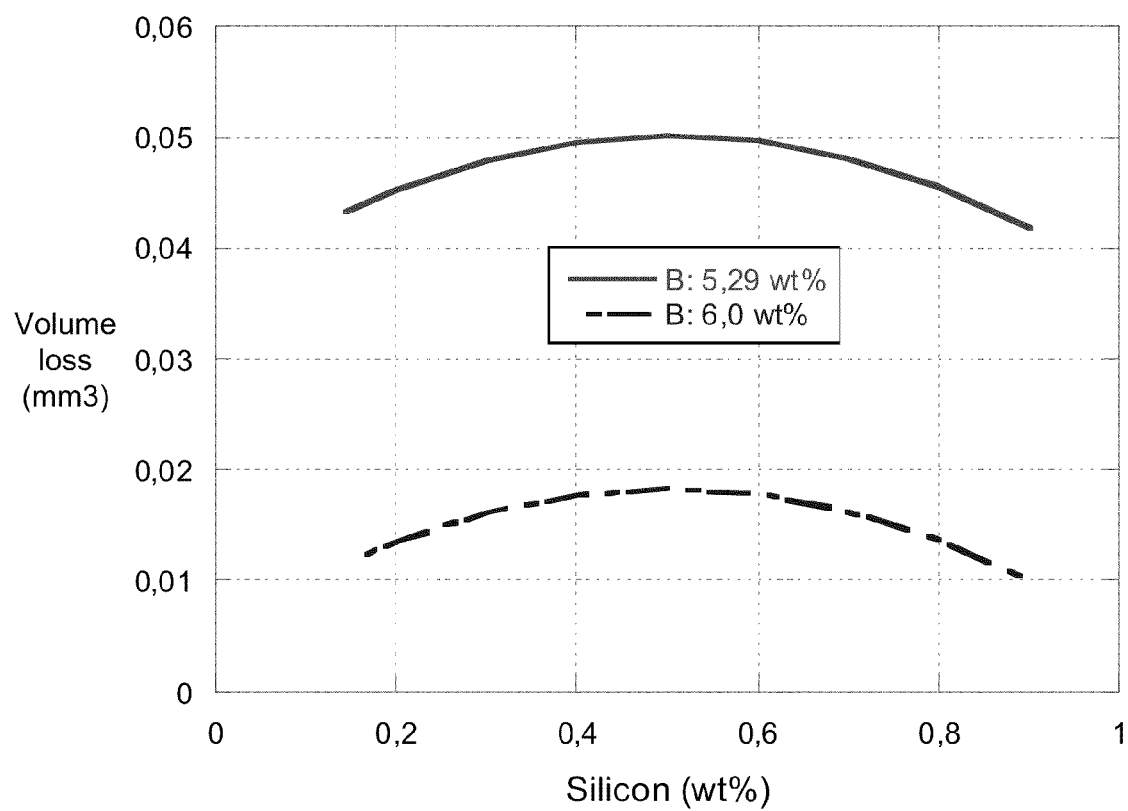
FIG. 14 is a graph showing an influence of silicon concentration on the dry erosion resistance at T: 25° C. and the impact angle of 25° for boron concentration of 5.29 and 6.0 wt %.
Figure 15:
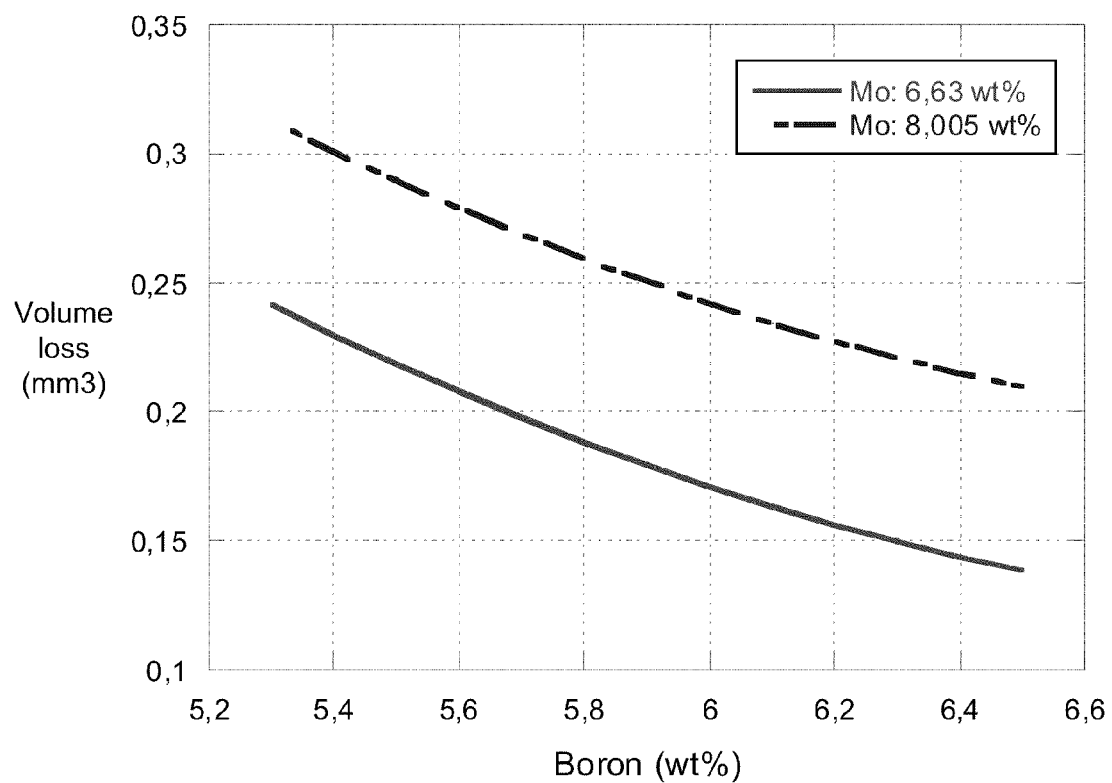
FIG. 15 is a graph showing an influence of boron concentration on the dry erosion resistance at T: 25° C. and the impact angle of 90° for molybdenum concentration of 5.63 and 8.005 wt %.
Figure 16:
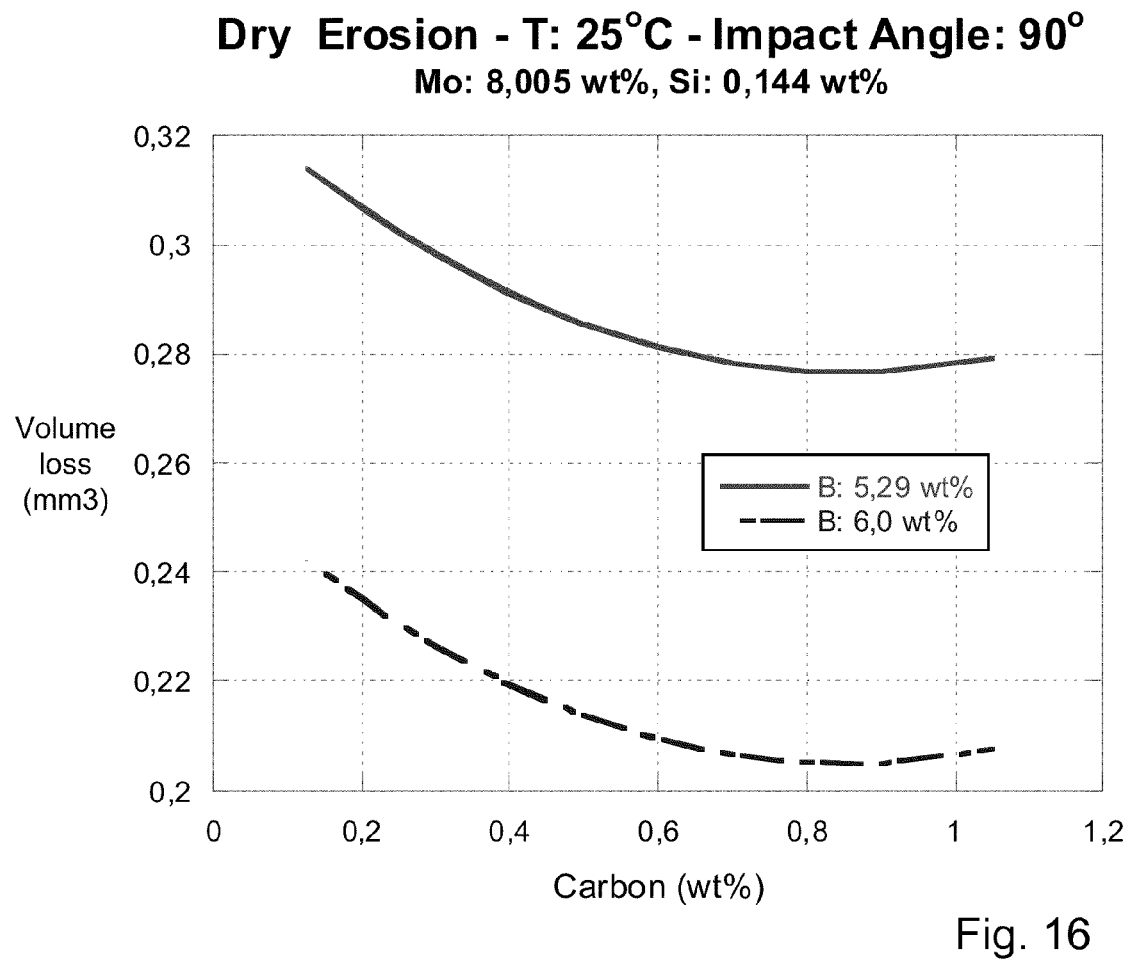
FIG. 16 is a graph showing an influence of carbon concentration on the dry erosion resistance at T: 25° C. and the impact angle of 90° for boron concentration of 5.29 and 6.0 wt %.
Figure 17:
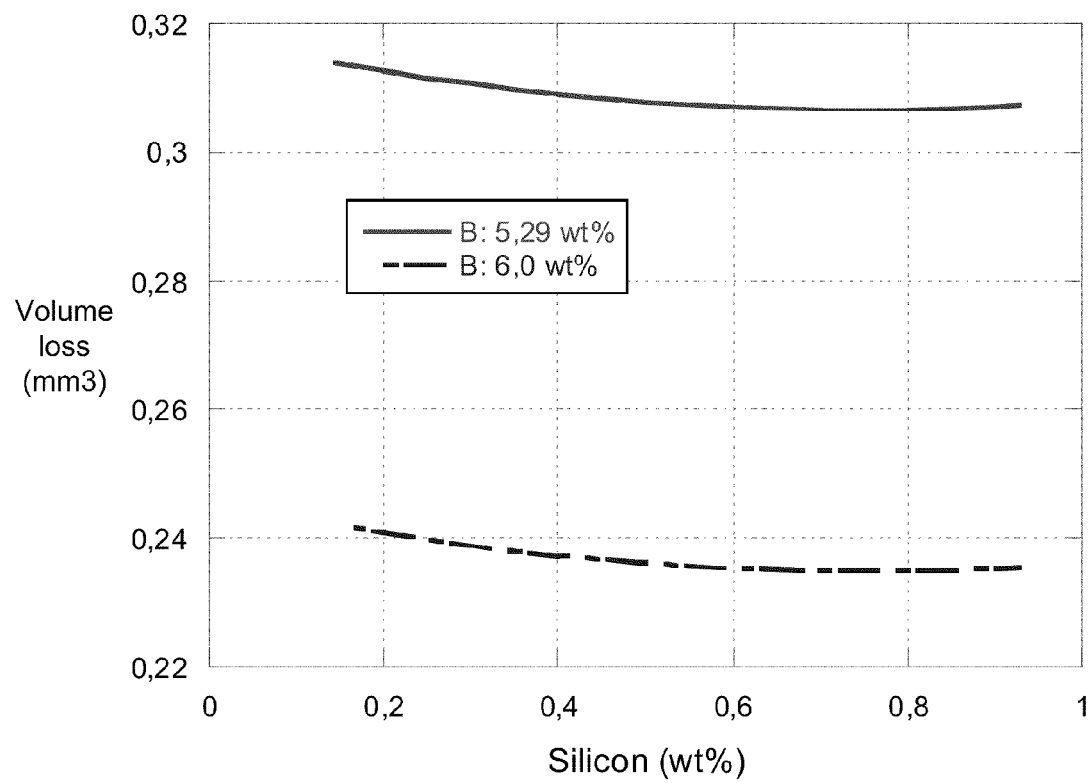
FIG. 17 is a graph showing an influence of silicon concentration on the dry erosion resistance at T: 25° C. and the impact angle of 90° for boron concentration of 5.29 and 6.0 wt %.

Discussion about Dry Erosion Resistance at T: 25° C.: Higher boron concentrations give more dry erosion resistant overlays at impact angles of 25° and 90° as depicted in FIGS. 12 and 15. However, it should be observed that lower molybdenum concentrations (5.63 wt %) are required to improve the dry erosion resistance at the impact angle of 90°. On the contrary, higher molybdenum concentrations are necessary for improving the dry erosion resistance at the impact angle of 25°. Higher dry erosion resistance at the impact angle of 25° are observed when the carbon concentration is lower than 0.2 wt % or higher than 1.0 wt %. (FIGS. 13 and 14). To a lesser extent, higher dry erosion resistance at the impact angle of 25° is observed for silicon concentrations lower than 0.2 wt % or higher than 0.9 wt %. On the contrary, increasing the carbon and silicon contents contributes to slightly increase the dry erosion resistance at the impact angle of 90° (FIGS. 16 and 17).

Figure 18:
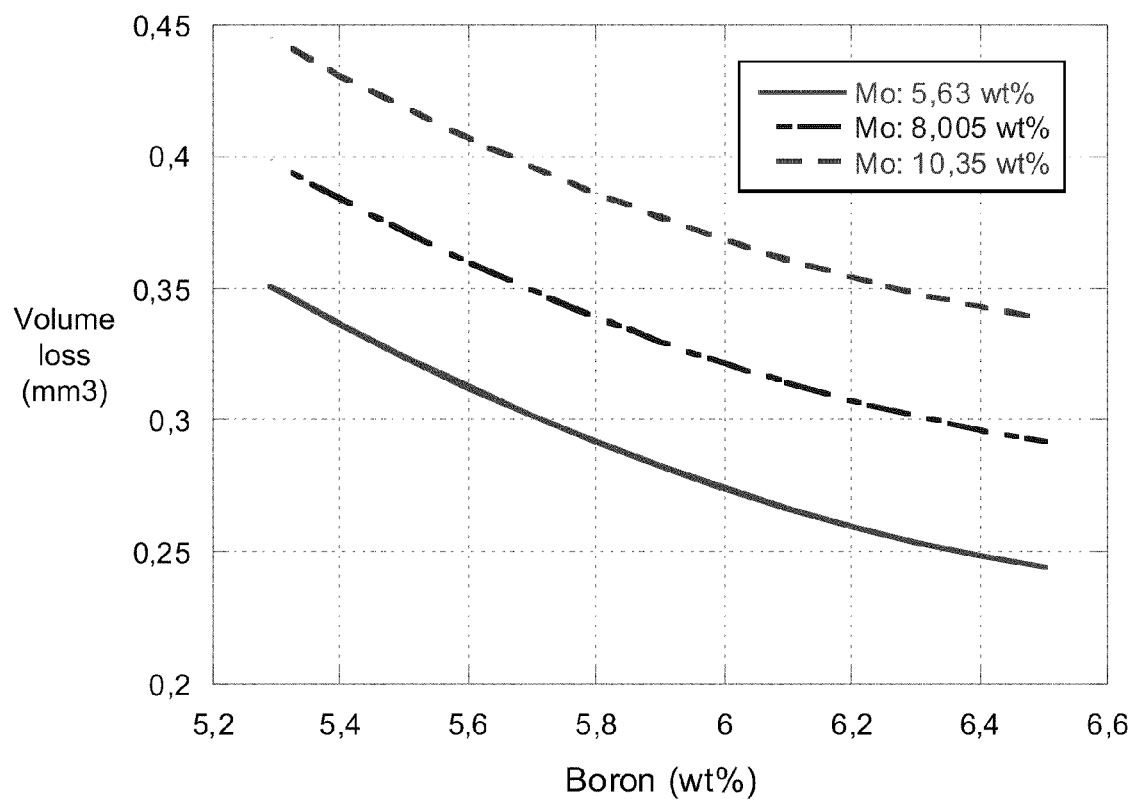
FIG. 18 is a graph showing an influence of boron concentration on the dry erosion resistance at T: 300° C. and the impact angle of 25° for molybdenum concentration of 5.63, 8.005 and 10.35 wt %.
Figure 19:
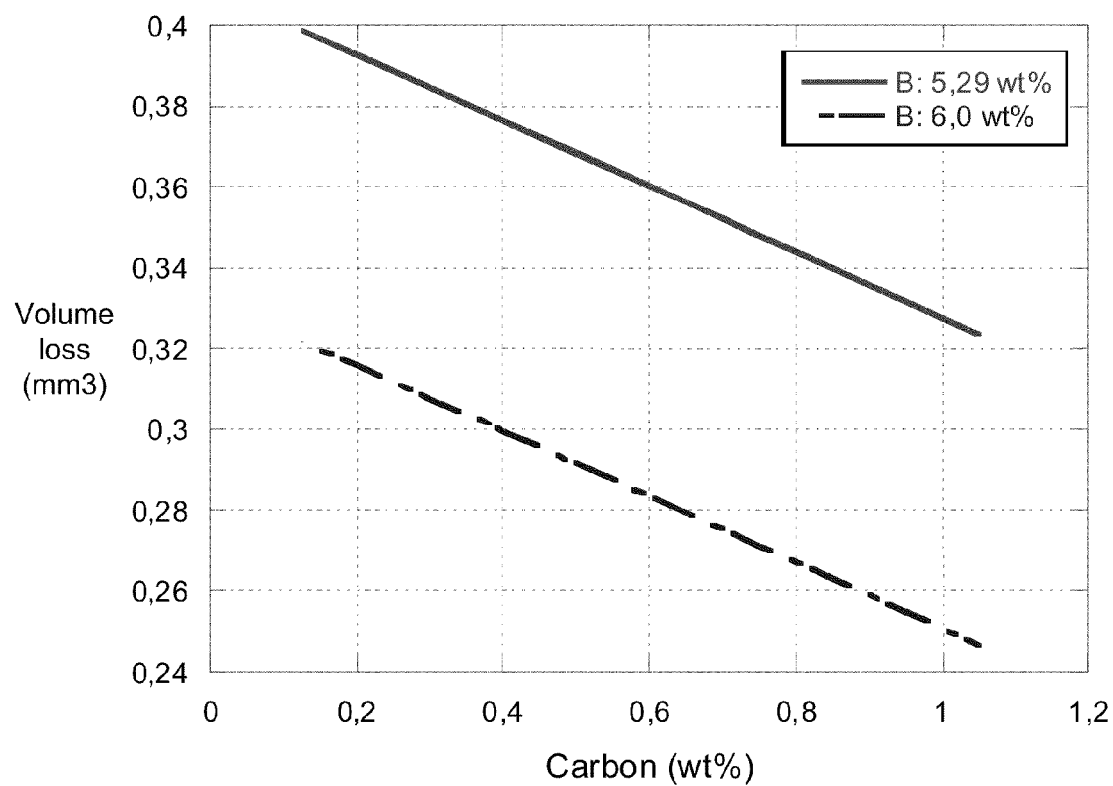
FIG. 19 is a graph showing an influence of carbon concentration on the dry erosion resistance at T: 300° C. and the impact angle of 25° for boron concentration of 5.29 and 6.0 wt %.
Figure 20:
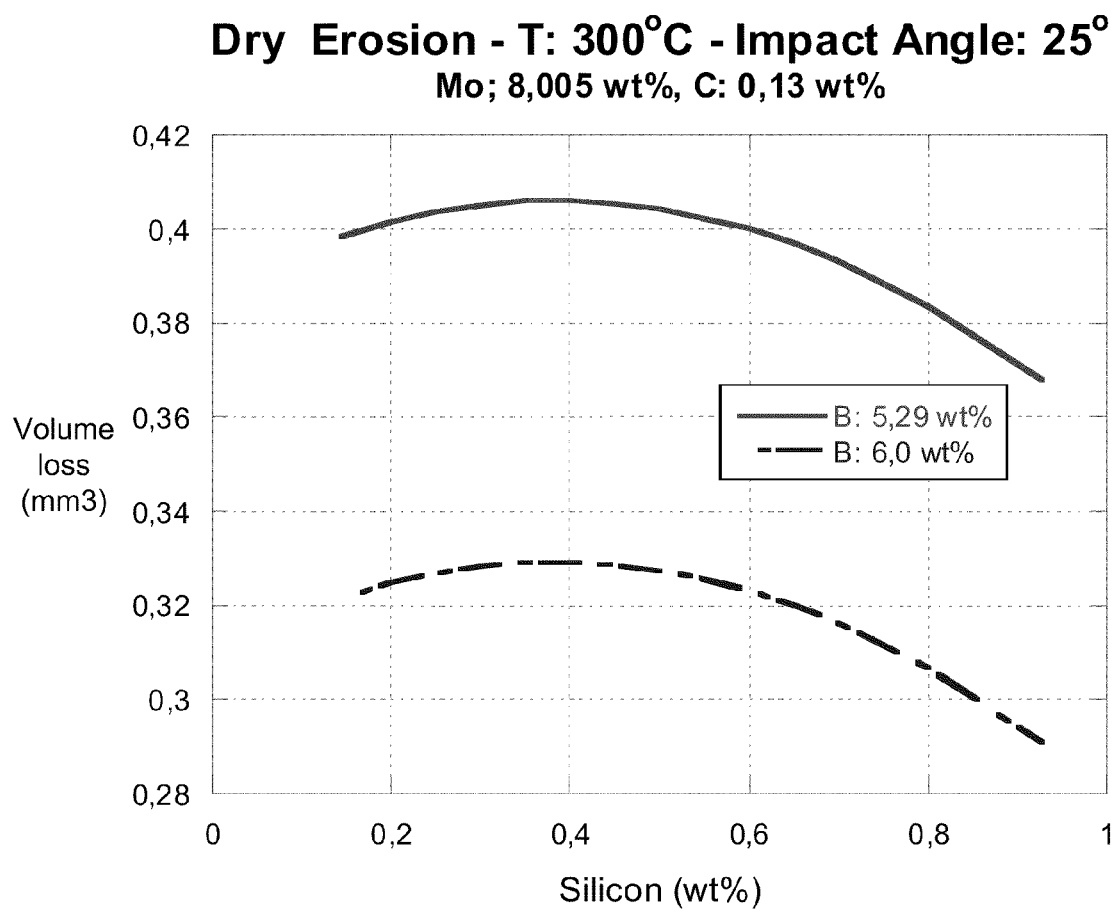
FIG. 20 is a graph showing an influence of silicon concentration on the dry erosion resistance at T: 300° C. and the impact angle of 25° for boron concentration of 5.29 and 6.0 wt %.
Figure 21:
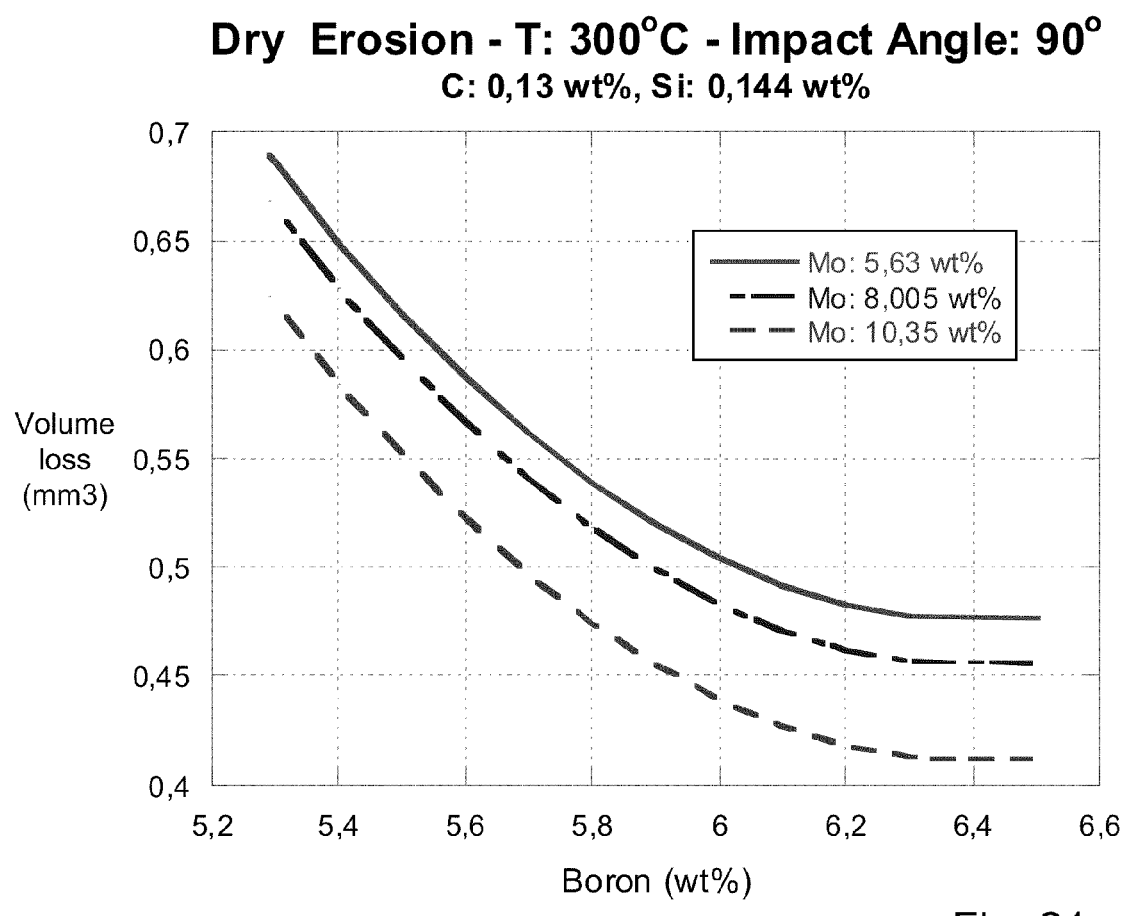
FIG. 21 is a graph showing an influence of boron concentration on the dry erosion resistance at T: 300° C. and the impact angle of 90° for molybdenum concentration of 5.63, 8.005 and 10.35 wt %.
Figure 22:
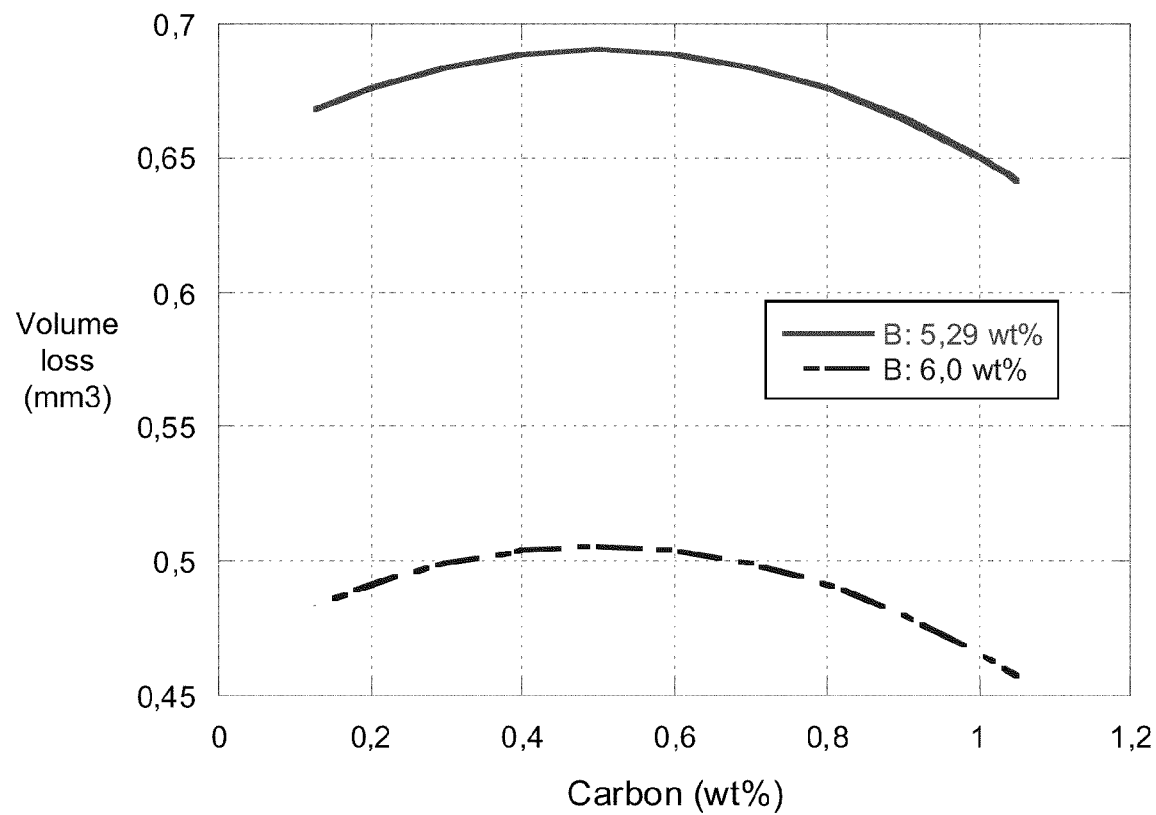
FIG. 22 is a graph showing an influence of carbon concentration on the dry erosion resistance at T: 300° C. and the impact angle of 90° for boron concentration of 5.29 and 6.0 wt %.
Figure 23:
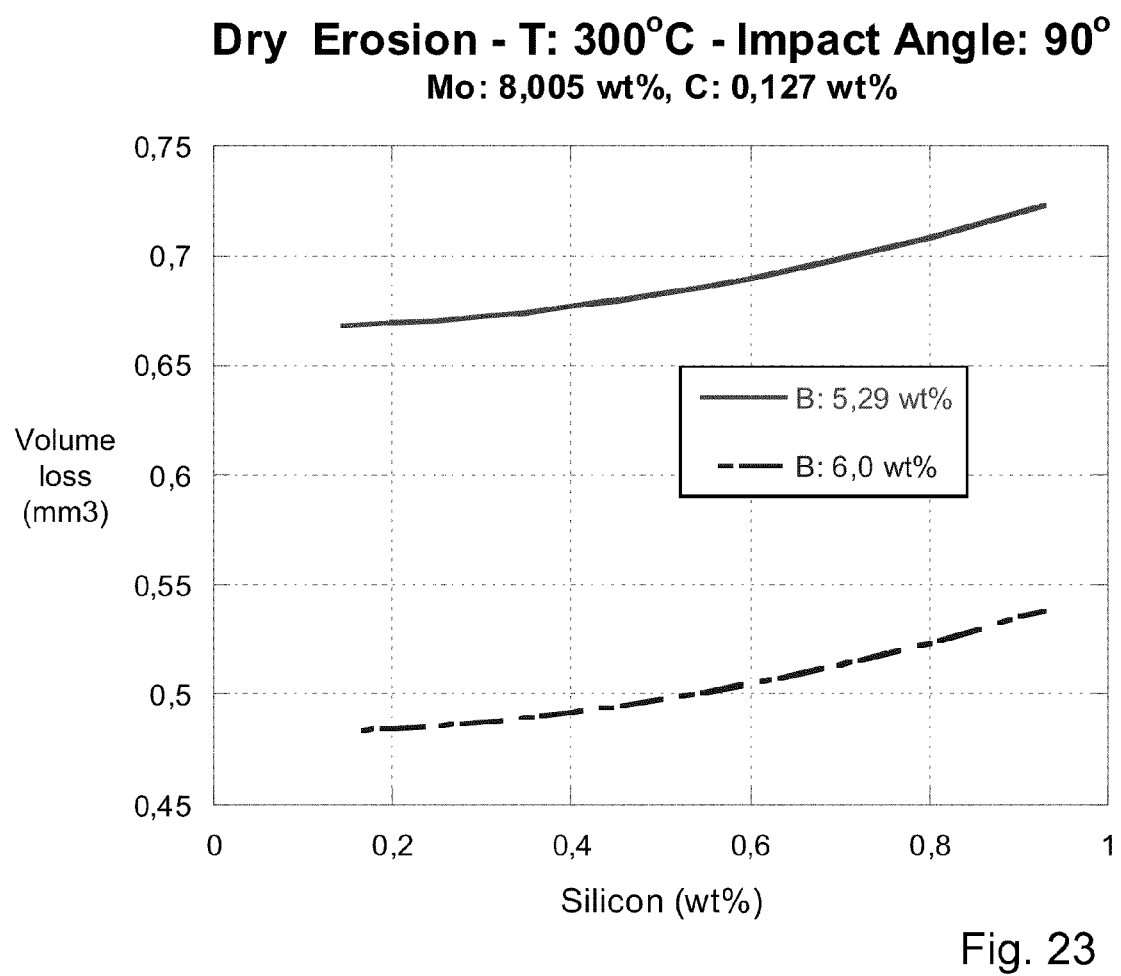
FIG. 23 is a graph showing an influence of silicon concentration on the dry erosion resistance at T: 300° C. and the impact angle of 90° for boron concentration of 5.29 and 6.0 wt %.

Discussion about Dry Erosion Resistance at T: 300° C.: At T: 300° C., higher boron concentrations leads to higher dry erosion resistance at both impact angles of 25° and 90° (FIGS. 18 and 21). However, contrary to dry erosion at T: 25° C., lower molybdenum concentrations are required for improving the dry erosion resistance at the impact angle of 25° (FIG. 18) and conversely higher molybdenum concentrations give better dry erosion resistance at the impact angle of 90° (FIG. 21). The dry erosion resistance at the impact angle of 25° linearly increases as the carbon concentration is increased (FIG. 19) and slightly decreases as the silicon concentration becomes higher than 0.65 wt % (FIG. 20). On the contrary, the dry erosion resistance at the impact angle of 90° increases as the silicon concentration increases (FIG. 23) and becomes better as the carbon concentration is higher than 0.85 wt % (FIG. 22).

Table 7 summarizes the influence of elements on the wear resistance properties. The symbol:
+ indicates a positive influence
++ indicates a strong positive influence
− indicates a negative influence
0 indicates no influence
(number) indicates the element concentration in wt % for positive influence.

properties. Other wear properties are more or less influenced by the Mo and C concentrations. Although silicon has a beneficial effect on the slurry erosion resistance at both impact angles of 30° and 90°, this element should be used in concentration lower than 0.2 wt % or higher than 0.9 wt % to observe improvement in dry erosion at T: 25° C. and the impact angle of 25°. The carbon concentration has a similar effect on this property. Depending upon the wear property required, the molybdenum concentration must be maintained low or high.

It should be also observed that any wear property such as the abrasion resistance or the dry erosion resistance at 25° C. and 300° C. cannot be used to predict the amplitude of the slurry erosion resistance at both impact angles of 30° and 90°.

Moreover, in the purpose of studying the Influence of Secondary Additives in Steel-Based Cored Wires, additives were also introduced in cored wires to further enhance the wear

TABLE 7

Relative influence of elements on the wear resistance properties.

| Element | Abrasion Volume Loss (mm³) | Slurry Erosion α: 30° Volume Loss (mm³) | Slurry Erosion α: 90° Volume Loss (mm³) | Dry Erosion T: 25° C. α: 25° Volume Loss (mm³) | Dry Erosion T: 25° C. α: 90° Volume Loss (mm³) | Dry Erosion T: 300° C. α: 25° Volume Loss (mm³) | Dry Erosion T: 300° C. α: 90° Volume Loss (mm³) |
|---|---|---|---|---|---|---|---|
| B  | + | + | + | ++ | + | + | + |
| Mo | 0 | 0 | ++ (>8) | + | − | − | + |
| C  | + | ++ | ++ | 0 | + | + | 0 |
| Si | 0 | + | + | 0 | 0 | 0 | − |

As observed in FIGS. 4 to 23 and in Table 7 the carbon concentration has a strong effect on the slurry erosion resistance at both impact angles of 30° and 90° and exceptional slurry erosion resistance are observed. The slurry erosion resistance at the impact angle of 90° is largely improved as the molybdenum concentration is higher than 8 wt %. Boron has a beneficial effect on all the properties measured. Although silicon has a beneficial effect on the slurry erosion resistance at both impact angles of 30° and 90°, this element has a negative effect or no noticeable effect on the other wear properties of overlays. The composition of these cored wires is depicted in Table 8. As observed in these cored wires the boron concentration is between ~6 to 6.21 wt %, the molybdenum concentration is within a range of 9-9.5 wt % and the carbon concentration is limited to 0.88 to 0.93 wt %. These concentration ranges were seen to present the best slurry erosion resistances. The wear properties of the overlays obtained by depositing these cored wires containing secondary additives are depicted in Table 9.

TABLE 8

Secondary additives in steel-based cored wires

| Sample number | B (wt %) | Mo (wt %) | C (wt %) | Si (wt %) | Cr (wt %) | Cu (wt %) | Mn (wt %) | Nb (wt %) | Ni (wt %) | TOTAL (wt %) |
|---|---|---|---|---|---|---|---|---|---|---|
| 599 | 6.08 | 9.09 | 0.90 | 0.24 | 1.87 | 1.12 | — | — | — | 19.30 |
| 598 | 5.98 | 8.93 | 0.89 | 0.23 | 1.87 | — | — | — | 1.10 | 19.00 |
| 597 | 5.96 | 8.90 | 0.88 | 0.23 | 1.87 | — | 1.12 | — | — | 18.97 |
| 586 | 6.02 | 9.18 | 0.91 | 0.20 | 2.96 | — | — | — | — | 19.27 |
| 584 | 6.18 | 9.32 | 0.92 | 0.20 | — | — | 2.63 | — | — | 19.27 |
| 579 | 6.05 | 9.23 | 0.91 | 0.20 | — | — | 1.12 | 1.86 | — | 19.38 |
| 578 | 6.00 | 9.15 | 0.91 | 0.74 | — | — | 1.11 | 0.74 | — | 18.64 |
| 577 | 6.09 | 9.28 | 0.92 | 0.75 | 1.87 | — | — | — | — | 18.91 |
| 576 | 6.09 | 9.29 | 0.92 | 0.75 | — | — | — | 1.87 | — | 18.93 |
| 568 | 6.18 | 9.32 | 0.92 | 0.75 | — | — | 1.50 | — | — | 18.67 |
| 564 | 6.15 | 9.39 | 0.93 | 0.20 | — | 0.76 | 1.51 | — | 0.76 | 19.70 |
| 563 | 6.11 | 9.33 | 0.92 | 0.20 | — | 1.50 | — | — | 1.50 | 19.57 |
| 562 | 6.03 | 9.20 | 0.91 | 0.74 | — | — | — | — | 1.86 | 18.75 |
| 557 | 6.18 | 9.46 | 0.92 | 0.21 | — | 1.86 | — | — | — | 18.63 |
| 555 | 6.07 | 9.26 | 0.92 | 0.74 | — | 0.75 | — | — | 1.12 | 18.85 |
| 554 | 6.17 | 9.54 | 0.92 | 0.94 | — | 0.75 | — | — | — | 18.31 |

TABLE 9

Wear resistance properties for overlays obtained with cored wires containing secondary additives.

| Sample | Abrasion Volume Loss (mm³) | Slurry Erosion α: 30° Volume Loss (mm³) | Slurry Erosion α: 90° Volume Loss (mm³) | Dry Erosion T: 25° C. α: 25° Volume Loss (mm³) | Dry Erosion T: 25° C. α: 90° Volume Loss (mm³) | Dry Erosion T: 300° C. α: 25° Volume Loss (mm³) | Dry Erosion T: 300° C. α: 90° Volume Loss (mm³) |
| --- | --- | --- | --- | --- | --- | --- | --- |
| 599 | 8.02 | 0.135 | 0.203 | 0.010 | 0.033 | 0.095 | 0.232 |
| 598 | 8.82 | 0.227 | 0.207 | 0.032 | 0.016 | 0.079 | 0.215 |
| 597 | 7.77 | 0.156 | 0.198 | 0.000 | 0.048 | 0.040 | 0.259 |
| 586 | 8.24 | 0.103 | 0.391 | 0.018 | 0.05 | 0.105 | 0.283 |
| 584 | 7.43 | 0.142 | 0.316 | 0.019 | 0.062 | 0.102 | 0.289 |
| 579 | 10.77 | 0.176 | 0.265 | 0.000 | 0.039 | 0.001 | 0.253 |
| 578 | 7.31 | 0.166 | 0.128 | 0.014 | 0.035 | 0.048 | 0.239 |
| 577 | 8.31 | 0.104 | 0.089 | 0 | 0.036 | 0.065 | 0.199 |
| 576 | 8.98 | 0.333 | 0.353 | 0.006 | 0.03 | 0.041 | 0.198 |
| 568 | 7.27 | 0.122 | 0.261 | 0.005 | 0.018 | 0.153 | 0.356 |
| 564 | 9.57 | 0.145 | 0.160 | 0.012 | 0.055 | 0.110 | 0.317 |
| 563 | 10.83 | 0.076 | 0.096 | 0.004 | 0.048 | 0.105 | 0.319 |
| 562 | 9.45 | 0.074 | 0.132 | 0.046 | 0.072 | 0.094 | 0.311 |
| 557 | 8.82 | 0.106 | 0.159 | 0.019 | 0.047 | 0.115 | 0.313 |
| 555 | 9.92 | 0.281 | 0.072 | 0.01 | 0.05 | 0.107 | 0.315 |
| 554 | 8.02 | 0.135 | 0.140 | 0.022 | 0.058 | 0.113 | 0.268 |

We would consider that improvement in slurry erosion resistance could be obtained if these overlays containing secondary additives presented a mean volume loss (volume loss at the impact angle of 30°+volume loss at the impact angle of 90°/2) of 0.150 mm³. As shown in table 10, some elements such as Mn and Nb have a disastrous effect on the slurry erosion resistance while other elements such as Cr, Ni, Cu in certain concentrations slightly increase the slurry erosion resistance.

TABLE 10

Influence of secondary additives on the mean volume loss due to slurry erosion.

| Sample Number | Secondary Additive Elements | Improvement in Mean Slurry Erosion Resistance (%) |
| --- | --- | --- |
| 599 | Cr + Cu | −13 |
| 598 | Cr + Ni | −44 |
| 597 | Cr + Mn | −18 |
| 586 | Cr: 3.0 wt % | −65 |
| 584 | 2.6 wt % Mn | −53 |
| 579 | Mn + 1.6 wt % Nb | −47 |
| 578 | Mn + 0.74 wt % Nb | 0 |
| 577 | 1.87 wt % Cr | 36 |
| 576 | Nb | −129 |
| 568 | 1.5 wt % Mn | −28 |
| 564 | Cu + Mn + Ni | 0 |
| 563 | 1.5 wt % Cu + 1.5 wt % Ni | 43 |
| 562 | Ni | 31 |
| 557 | Cu | 12 |
| 555 | 0.75 wt % Cu + 1.1 wt % Ni | −18 |
| 554 | Cu | 8 |

Studies, exposed above, show that good resistances of the composite material 20 against erosive agents are obtained with cored wires comprising at least one of Boron 5.2-6.5 wt % and mores specifically 5.29-6.50 wt %, Molybdenum 5.5-11.0 wt % and more specifically 5.63-10.38 wt %, Carbon 0.5-1.1 wt % and more specifically 0.55-1.0 wt % and Silicon 0.1-1.0 wt % and more specifically 0.14-1.0 wt %. Best resistances of the composite material 20 against erosive agents are obtained with cored wires comprising Bore 6.0-6.40 wt %, Molybdenum 8-11 wt %, Carbon 0.8-1 wt % and Silicon 0.7-1 wt %. Table 11 depicts examples of compositions of cored wire adapted to obtain good resistances depending on the erosive agent.

TABLE 11

Examples of compositions of cored wire adapted to obtain good resistances depending on the erosive agent.

| Element | Abrasion Volume Loss (mm³) | Slurry Erosion α: 30° Volume Loss (mm³) | Slurry Erosion α: 90° Volume Loss (mm³) | Dry Erosion T: 25° C. α: 25° Volume Loss (mm³) | Dry Erosion T: 25° C. α: 90° Volume Loss (mm³) | Dry Erosion T: 300° C. α: 25° Volume Loss (mm³) | Dry Erosion T: 300° C. α: 90° Volume Loss (mm³) |
| --- | --- | --- | --- | --- | --- | --- | --- |
| B | 6.4 | 6.4 | 6.2 | 6.4 | 6.4 | 6.4 | 6.2 |
| Mo | 10 | 0 | 10.4 | 10.4 | 10.4 | 10.4 | 10.4 |

TABLE 11-continued

Examples of compositions of cored wire adapted to obtain good resistances depending on the erosive agent.

| Element | Abrasion Volume Loss (mm³) | Slurry Erosion α: 30° Volume Loss (mm³) | Slurry Erosion α: 90° Volume Loss (mm³) | Dry Erosion T: 25° C. α: 25° Volume Loss (mm³) | Dry Erosion T: 25° C. α: 90° Volume Loss (mm³) | Dry Erosion T: 300° C. α: 25° Volume Loss (mm³) | Dry Erosion T: 300° C. α: 90° Volume Loss (mm³) |
|---|---|---|---|---|---|---|---|
| C | 1 | 0.9 | 0.9 | <0.6> | 0.8 | 1 | >0.8 |
| Si | — | 0.9 | 0.9 | <0.5> | 0.8 | 0.9 | 0.2 |

Figure 24:
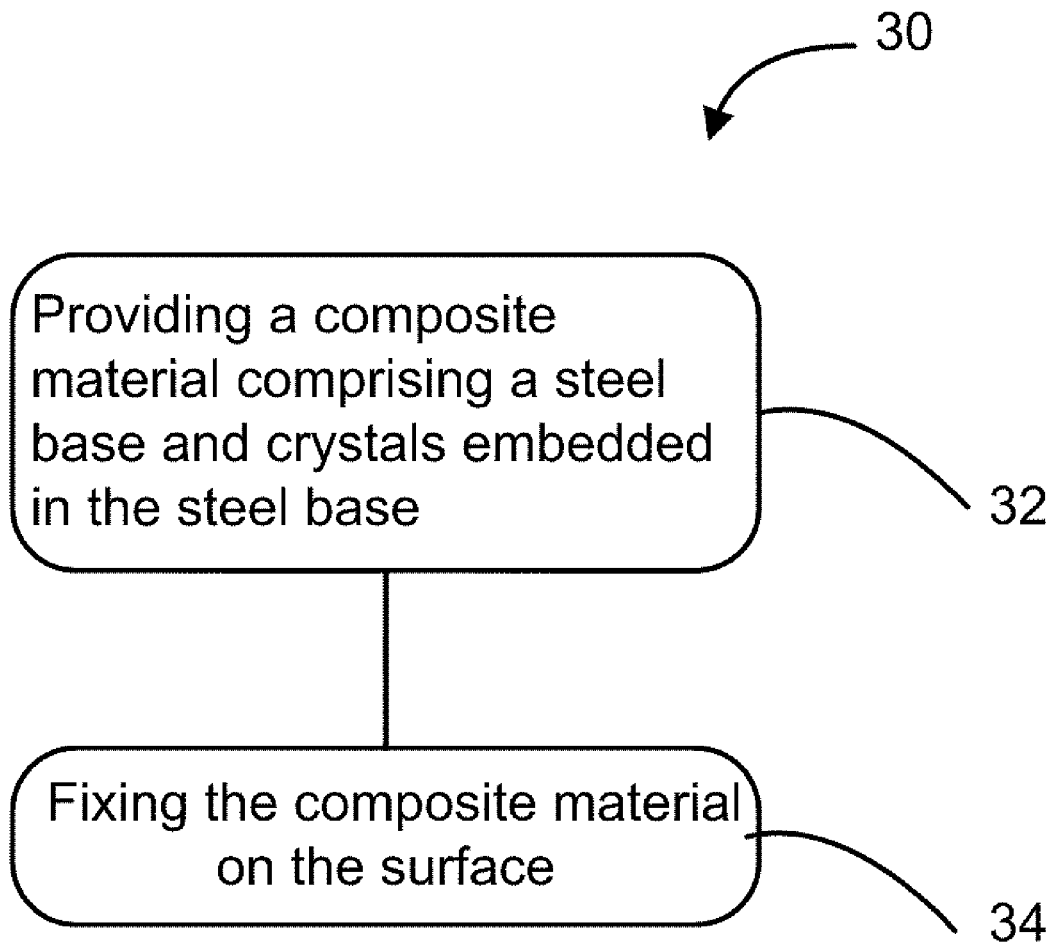
FIG. 24 is a flowchart showing a method for forming a composite material on a surface for increasing the resistance to degradation of the surface by an erosive agent according to an embodiment.

Referring now to FIG. 24, there is shown a block diagram of a method 30 for forming a composite material on a surface for increasing the resistance to degradation of the surface by an erosive agent. The method comprises providing composite material comprising a steel base and crystals embedded in the steel base (step 32). At least 50% of the crystals have an elongated portion. The method further comprises fixing the composite material on the surface (step 34).

Figure 25:
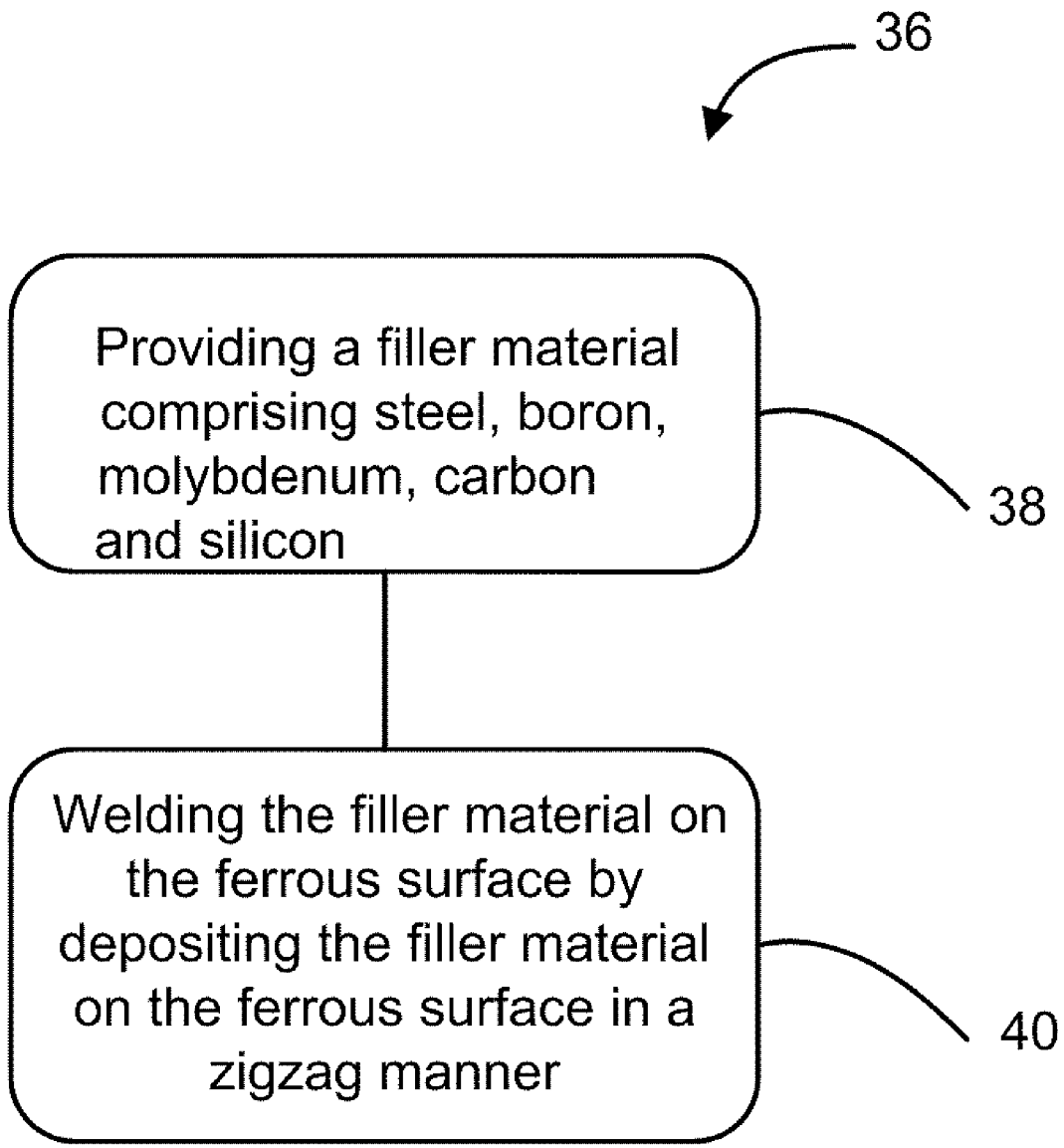
FIG. 25 is a flowchart showing a method for forming a composite material on a ferrous surface for increasing the resistance to degradation of the ferrous surface by an erosive agent according to an embodiment.

Referring now to FIG. 25, there is shown a block diagram of a method 36 for forming a composite material on a ferrous surface for increasing the resistance to degradation of the ferrous surface by an erosive agent. The method comprises providing a filler material comprising steel, boron, molybdenum and silicon (step 38). The method further comprises welding the filler material on the ferrous surface by depositing the filler material on the ferrous surface in a zigzag manner (step 40).

While preferred embodiments have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A coated surface comprising a surface having a coating thereon, wherein the coating, which has an external surface exposed to erosion, comprises a composite material; wherein the composite material consists of from more than 25% to 40% by volume of a bainitic steel base and from 60% to less than 75% by volume of embedded crystals of which at least 50% by volume of the embedded crystals are $Fe_2B$ elongated crystals; and wherein at least 50% by volume of the $Fe_2B$ elongated crystals are in substantially transverse orientation with respect to the external surface.

2. A coated surface comprising a surface having a coating thereon, wherein the coating, which has an external surface exposed to erosion, comprises a composite material adapted to resist degradation by an erosive agent; wherein the composite material comprises from more than 25% to 40% by volume of a bainitic steel base and from 60% to less than 75% by volume of embedded crystals of which at least 50% by volume of the embedded crystals are $Fe_2B$ elongated crystals; and wherein at least 50% by volume of the $Fe_2B$ elongated crystals are in substantially transverse orientation with respect to the external surface.

3. The coated surface of claim 2, wherein at least 50% by volume of the embedded crystals are columnar.

4. A coated surface comprising a ferrous surface having a coating thereon, wherein the coating, which has an external surface exposed to erosion, consists of a composite material; wherein the composite material consists of from more than 25% to 40% by volume of a bainitic steel base and from 60% to less than 75% by volume of embedded crystals of which at least 50% by volume of the embedded crystals are $Fe_2B$ elongated crystals; and wherein at least 50% by volume of the $Fe_2B$ elongated crystals are in substantially transverse orientation with respect to the external surface.

* * * * *